US008423201B2

(12) United States Patent
Burdette et al.

(10) Patent No.: US 8,423,201 B2
(45) Date of Patent: Apr. 16, 2013

(54) ENHANCED AZIMUTH ANTENNA CONTROL

(75) Inventors: Joseph B. Burdette, Rockville, MD (US); James A. Martin, Bel Air, MD (US)

(73) Assignee: United States Antenna Products, LLC, Frederick, MD (US)

( * ) Notice: Subject to any disclaimer, the term of this patent is extended or adjusted under 35 U.S.C. 154(b) by 894 days.

(21) Appl. No.: 12/550,609

(22) Filed: Aug. 31, 2009

(65) Prior Publication Data

US 2010/0292845 A1 Nov. 18, 2010

Related U.S. Application Data

(60) Provisional application No. 61/177,791, filed on May 13, 2009.

(51) Int. Cl.
*G05D 1/02* (2006.01)

(52) U.S. Cl.
USPC ............................ 700/302; 343/766; 343/882

(58) Field of Classification Search .................... 700/62, 700/275, 302; 343/757, 758, 760, 761, 763–766, 343/878, 880, 882, 890, 892
See application file for complete search history.

(56) References Cited

U.S. PATENT DOCUMENTS

| | | | |
|---|---|---|---|
| 3,996,592 | A | 12/1976 | Kline et al. |
| 4,109,191 | A | 8/1978 | Callaghan |
| 4,446,407 | A | 5/1984 | Sperber |
| 4,470,050 | A | 9/1984 | Ellingson et al. |
| 4,496,890 | A | 1/1985 | Wurdack et al. |
| 4,839,660 | A | 6/1989 | Hadzoglou |
| 5,153,485 | A | 10/1992 | Yamada et al. |
| 5,155,496 | A | 10/1992 | Suga |
| 5,157,410 | A | 10/1992 | Konishi |
| 5,402,140 | A | 3/1995 | Rodeffer |
| 5,512,914 | A | 4/1996 | Hadzohlou et al. |
| 5,990,845 | A | 11/1999 | Sharp et al. |
| 6,188,300 | B1 | 2/2001 | Rodeffer |
| 6,195,060 | B1 | 2/2001 | Spano et al. |
| 6,204,823 | B1 | 3/2001 | Spano et al. |
| 6,480,161 | B2 | 11/2002 | Watson |
| 6,512,490 | B1 | 1/2003 | Lee |
| 6,529,173 | B1 | 3/2003 | Sneitzer et al. |
| 6,677,896 | B2 | 1/2004 | Singer et al. |
| 6,864,847 | B2 | 3/2005 | Wensink |
| 6,914,578 | B1 | 7/2005 | Menahem |
| 7,142,168 | B1 | 11/2006 | Sinclair |
| 7,298,342 | B2 | 11/2007 | Young et al. |
| 7,418,359 | B2 | 8/2008 | Handa |
| 7,427,962 | B2 | 9/2008 | Yang |

(Continued)

*Primary Examiner* — Jeffrey A Gaffin
*Assistant Examiner* — Chad Rapp

(57) ABSTRACT

An assembly that has a rotator element, a sensor element coupled to the rotator element or assembly, and a controller element provides azimuth antenna control. The rotator element has a worm gear driven slewing ring having a through hole through which a feed line to an antenna may be inserted to accommodate continuous rotation of greater than 360 degrees or partial rotation in either direction of the antenna coupled to the rotator element. The controller element is coupled to the rotator element and to the sensor element, and the controller element receives feedback information concerning a current azimuth position of the antenna from the sensor element to control the rotator element to rotate to a future azimuth position of the antenna in accordance with a selected azimuth function and the feedback information provided by the sensor element.

34 Claims, 32 Drawing Sheets

2500

U.S. PATENT DOCUMENTS

| | | | | |
|---|---|---|---|---|
| 7,439,930 | B2 | 10/2008 | Bury | |
| 7,474,173 | B2 | 1/2009 | Avramis et al. | |
| 7,642,961 | B1 * | 1/2010 | Rausch | 342/367 |
| 2002/0072813 | A1 | 6/2002 | Ito | |
| 2002/0084946 | A1 | 7/2002 | Matz et al. | |
| 2002/0084948 | A1 | 7/2002 | Watson | |
| 2002/0105478 | A1 | 8/2002 | Overton | |
| 2002/0140620 | A1 | 10/2002 | Yamauchi et al. | |
| 2003/0201937 | A1 | 10/2003 | Lee | |
| 2003/0201947 | A1 | 10/2003 | Boucher | |
| 2004/0155827 | A1 | 8/2004 | Taylor | |
| 2004/0222931 | A1 | 11/2004 | Matz et al. | |
| 2005/0248498 | A1 | 11/2005 | Webb et al. | |
| 2006/0195254 | A1 * | 8/2006 | Ladetto et al. | 701/207 |
| 2006/0201238 | A1 | 9/2006 | Trapasso et al. | |
| 2007/0001920 | A1 | 1/2007 | Webb et al. | |
| 2007/0021095 | A1 | 1/2007 | Cheng et al. | |
| 2007/0052604 | A1 | 3/2007 | Young et al. | |
| 2007/0052605 | A1 | 3/2007 | Young et al. | |
| 2007/0152124 | A1 | 7/2007 | Staney | |
| 2007/0241979 | A1 | 10/2007 | Yang | |
| 2008/0278396 | A1 | 11/2008 | Blalock et al. | |
| 2008/0278404 | A1 | 11/2008 | Blalock et al. | |
| 2008/0290228 | A1 | 11/2008 | Haight | |
| 2008/0291114 | A1 | 11/2008 | Haight | |
| 2009/0021438 | A1 | 1/2009 | Webb et al. | |
| 2009/0058745 | A1 | 3/2009 | Holt et al. | |

* cited by examiner

*FIG. 33*
| | |
|---|---|
| 201 | Stopped |
| 251 > | Rotator in motion, turning clockwise |
| < 13 | Rotator in motion, turning counterclockwise |
| 197<br>OFFLINE | Rotator is offline (in manual mode or server testing). It will not respond to client commands when in this state. |
| ERROR | Error condition. This indicates a serious error with the rotator (such as a broken sensor or rotator failure). |
*FIG. 34*
*FIG. 35*
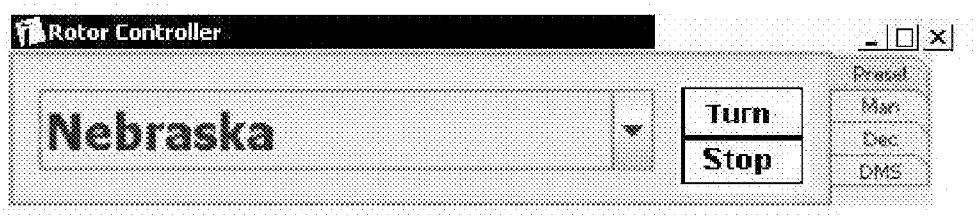

ENHANCED AZIMUTH ANTENNA CONTROL

PRIORITY CLAIM

This application claims priority to U.S. Provisional Patent Application No. 61/177,791 filed May 13, 2009, which is hereby incorporated herein by reference.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

FIELD OF THE INVENTION

The invention relates generally to rotation of antennas. More particularly, the invention relates to a method, system and apparatus for rotating antennas using a worm gear driven slewing ring of a rotator element that is controlled by a sensor element, such as a magnetically controlled absolute encoder.

BRIEF DESCRIPTION OF THE DRAWINGS

FIG. 33 illustrates a GUI that indicates when a rotator is in motion or is in an offline or error state, in accordance with various embodiments.

FIG. 34 illustrates a disabled rotator control panel, in accordance with various embodiments.

FIG. 35 illustrates a Preset Tab GUI, in accordance with various embodiments.

Figure 1:
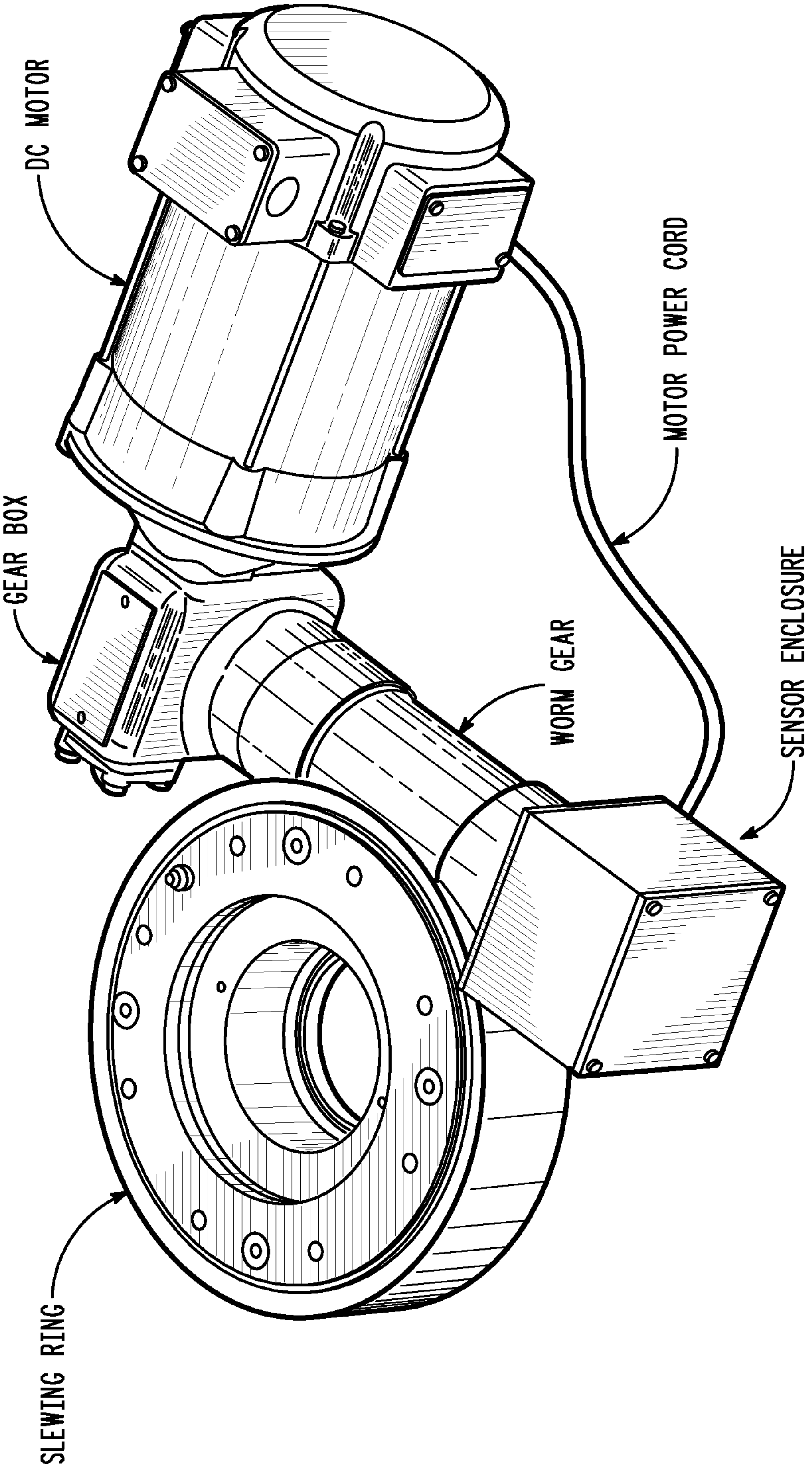
FIG. 1 is an overall view of an assembly, including a sensor element and a rotator element with a worm gear driven slewing ring with through hole, which in turn is attached to the sensor element, and a DC Motor, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

It will be appreciated that embodiments of the invention described herein may be comprised of one or more conventional processors and unique stored program instructions that control the one or more processors to implement, in conjunction with certain non-processor circuits, some, most, or all of the functions described herein. The non-processor circuits may include, but are not limited to, a radio receiver, a radio transmitter, signal drivers, clock circuits, power source circuits, and user input devices. As such, these functions may be interpreted as a method to perform functions such as acquisition of a new policy in accordance with certain embodiments consistent with the present invention. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the specification, specific embodiments of the present invention will be described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The embodiments described herein refer to enhanced rotation of antennas, which may be of varying types. Rotation may be horizontal or vertical or variation thereof. Rotation of a rotator element is effected by a worm gear that is controlled by a sensor that provides feedback to a controller element; the rotator assembly or rotator element may have a gear reduction system directly coupled to the worm gear that controls the sensor element. The type of antenna being controlled may be of many different types, including a single element antenna, a multiple element antenna, a directional planar type antenna, and a composite antenna comprised of one or more wire, rod or tube elements.

An assembly, system and method for azimuth antenna control are provided by the various embodiments presented herein. In accordance with various embodiments of an assembly suitable to provide azimuth antenna control, the assembly has a rotator element, a sensor element coupled to the rotator element or assembly, and a controller element. The rotator element has a worm gear driven slewing ring, with the slewing ring having a through hole through which a feed line to an antenna may be inserted to accommodate continuous rotation of greater than 360 degrees or partial rotation in either direction of the antenna coupled to the rotator element. The controller element is coupled to the rotator element and to the sensor element, and the controller element receives feedback information concerning a current azimuth position of the antenna from the sensor element and controls the worm gear driven slewing ring of the rotator element to rotate to a future azimuth position of the antenna in accordance with a selected azimuth function and the feedback information provided by the sensor element. The controller element can be remotely controlled and accessed via the Internet. The rotator element may have dimensions that fit within an 18 inch face width tower section splice.

As used herein, an absolute encoder means that position information is generated whenever the power is available without recalibrating or re-zeroing the absolute encoder. As taught by various embodiments, the sensor element may be a magnetically controlled absolute encoder which provides feedback to the control element. For example, a bar magnet position sensor solid state absolute encoder is able to generate azimuth information to the controller element whenever power is provided and does not require recalibration or resetting to zero in the event of power interruption. The sensor element may be a magnetically controlled absolute encoder, such as a solid state, selsyns or synchro encoder or the like.

The output shaft of a DC motor employs a gear reduction box coupled to the worm gear driven slewing ring of the rotator element. The controller element controls rotation of the worm gear driven slewing ring by varying the voltage to the DC motor. The controller element has a ramp feature that controls a rotation speed of the rotator element to ramp up in speed or ramp down in speed by varying the speed of rotation of the worm gear driven slewing ring. As will be described, the ramp feature may be set by a user interfacing with a user interface of the controller element during a setup mode of the controller element. The average voltage may be ramped up and/or down slowly in order to limit torque spikes, or a pulse width modulation scheme may be used.

The selected azimuth function may be a user selected azimuth function, such as a previously defined user selected azimuth function. The user can select the user selected azimuth by interfacing with a user interface of the controller element, as will be seen below. The controller element thus may have a user interface whereby a user of the controller element can control the future azimuth position of the antenna in accordance with the selected azimuth function selected by using the user interface. The controller element may also have a programmed processor that controls operation of the user interface, receives user inputs from the user interface, and controls operation of the rotator element to rotate to the future azimuth position of the antenna in accordance with the user selected azimuth function and the feedback information provided by the sensor element. As will be described, the user interface is capable of providing three options for the selected azimuth function to the user, including a rotary option, a forever option, and a limits option. When the rotary option is selected, the programmed processor of the controller element controls the worm gear driven slewing ring of the rotator element to rotate greater than 360 degrees; when the forever option is selected, the programmed processor of the controller element controls the worm gear driven slewing ring of the rotator element to continuously rotate in a selected direction; and when the limits option is selected, the programmed processor of the controller element controls the worm gear driven slewing ring of the rotator element to rotate less than 360 degrees. These three options for the selected azimuth function are provided to the user via the user interface during a setup mode of the controller element.

In accordance with various embodiments, a system provides remote azimuth antenna control and includes a sensor element coupled to the rotator element; a server coupled to the rotator element; and a plurality of controller elements, wherein the server controls operation of each controller element of the controller elements over a plurality of network connections between the server and the plurality of controller elements. For each controller element of the plurality of controller elements that is coupled to the server, the controller element receives feedback information concerning a current azimuth position of the antenna from the sensor element and the controller element controls the rotator element to rotate to a future azimuth position of the antenna in accordance with a selected azimuth function and the feedback information provided by the sensor element. As will be described, the server has a number of preset locations, and names of the preset locations are sent to each controller element that is coupled to the server. The future azimuth position of the antenna is given by the azimuth of the future azimuth position, is calculated from a latitude and a longitude, or is a preset location.

As previously described, the rotator element comprises a worm gear driven slewing ring having a through hole through which a coaxial feed line may be inserted to accommodate a continuous rotation of greater than 360 degrees or partial rotation in either direction of an antenna coupled to the rotator element. The controller element of the plurality of controller elements can be remotely controlled and accessed via the Internet. Moreover, the feed line may be a rotary joint coupled feed line as will be seen.

Referring now to the drawings, FIG. 1 is an overall view of an assembly, including a sensor element, a worm gear driven slewing ring with through hole (and without cover) attached to the worm gear, which in turn is attached to the sensor element, and a DC Motor, in accordance with certain embodiments. The DC Motor, attached to sensor enclosure by the motor power cord, as well as to the gear box that drives a worm gear of a slewing ring. The sensor enclosure can be seen coupled to the worm gear and the worm gear driven slewing ring.

Figure 2:
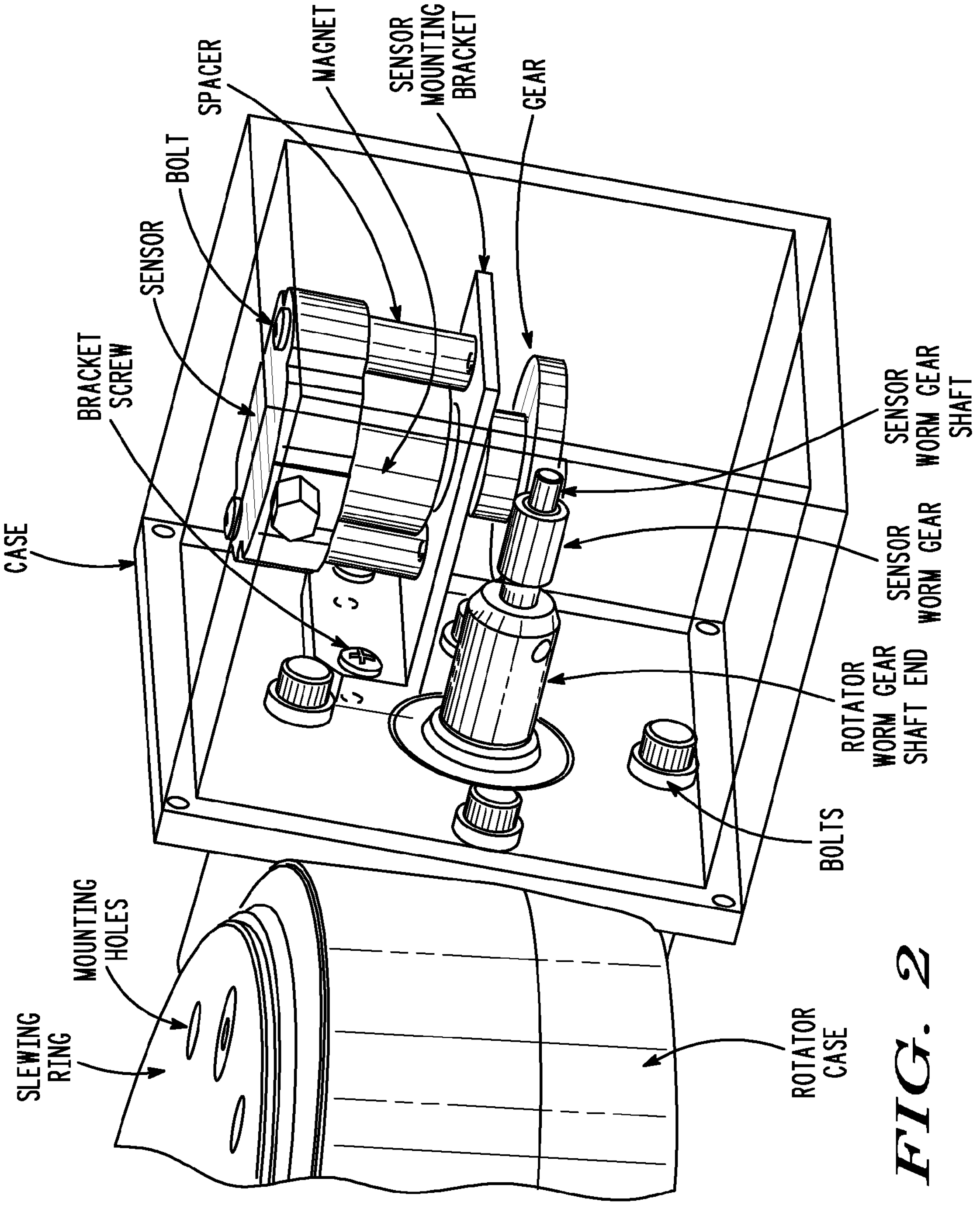
FIG. 2 is another view of an assembly, with details of the sensor element shown in the box, in accordance with certain embodiments.

FIG. 2 is another view of an assembly, with details of the sensor element shown in the box, in accordance with certain embodiments. Details of the sensor element are shown in the box. the mounting holes of the slewing ring can be seen. Within the case of the sensor, the rotator worm gear shaft end, sensor worm gear shaft, and sensor worm gear can be seen. The sensor can be seen mounted on a sensor mounting bracket separated by spacers. The magnet of the magnetic sensor is shown, as is the bracket screw, bolts, and case for housing and protecting the sensor. As previously mentioned, the sensor element may be a magnetically controlled absolute encoder.

Figure 3:
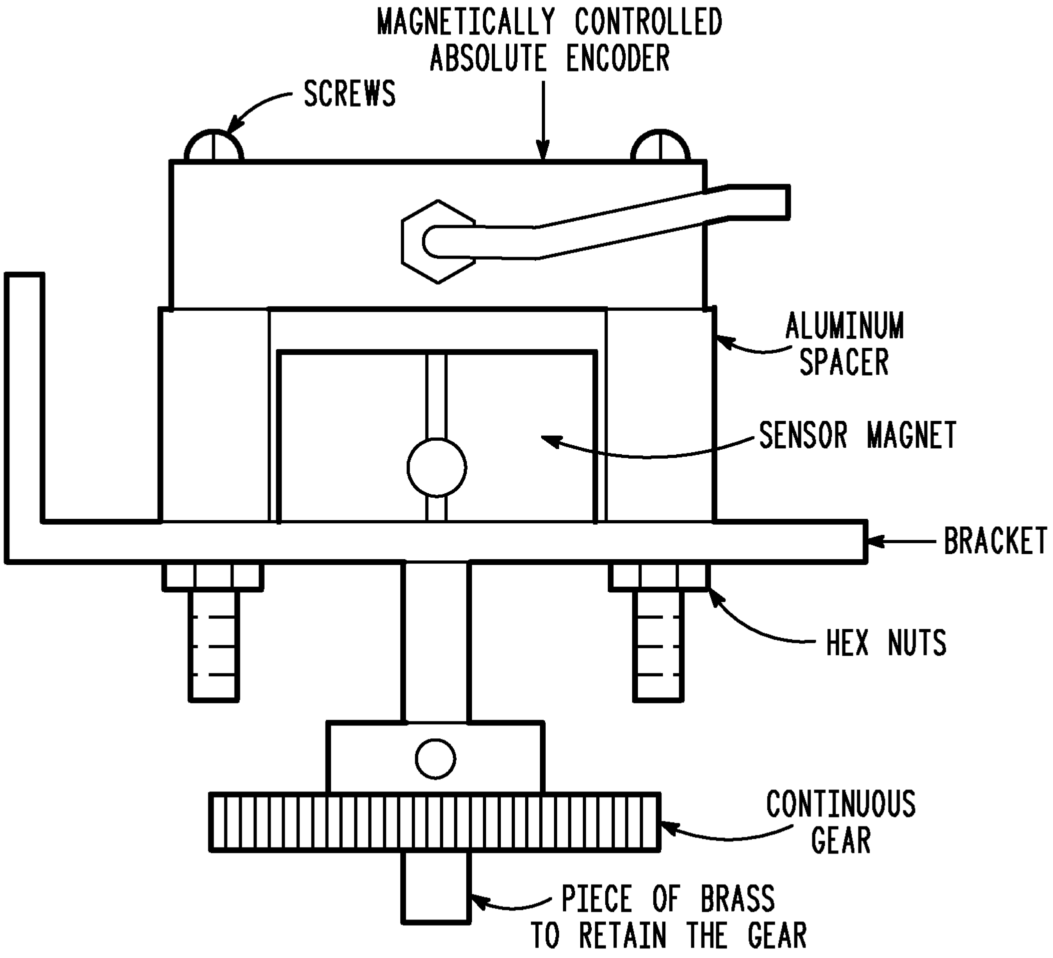
FIG. 3 is a view that shows the sensor element, here shown as magnetically controlled absolute encoder, in accordance with certain embodiments.

FIG. 3 is a view that shows the sensor element, here shown as a magnetic sensor, in accordance with certain embodiments. A continuous gear, a piece of brass to retain the gear, a bracket for the sensor, an aluminum spacer, a magnetic sensor, screws, hex nuts, a sensor magnet, a snap ring and lockwashers, respectively, are illustrated. The magnetic sensor may be a magnetically controlled absolute encoder, such as a bar magnet position sensing absolute encoder, in which case the bar magnet is embedded in the disk shown. Screws hold the sensor in position, as do hex Nuts.

Figure 4:
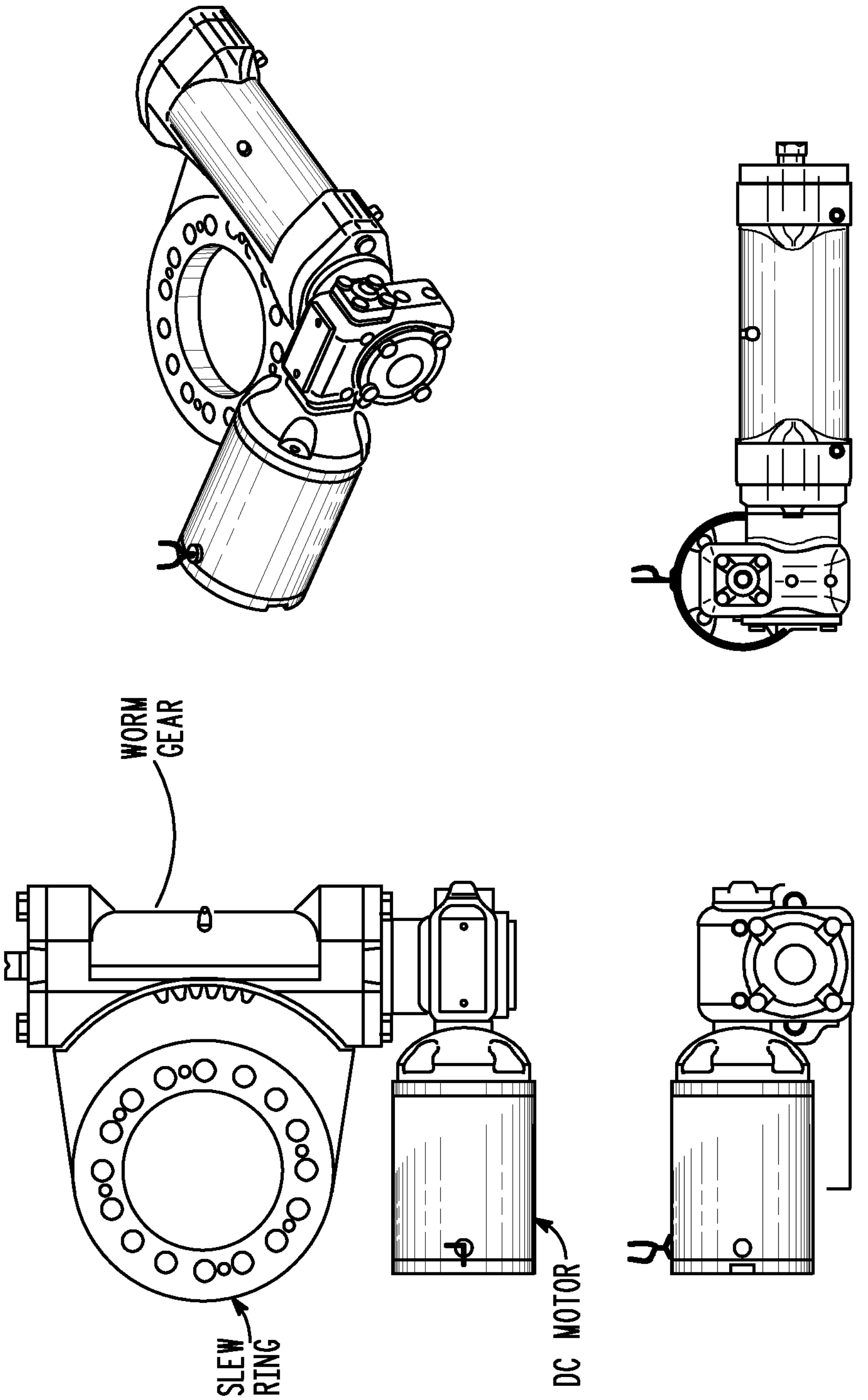
FIG. 4 illustrates the slewing ring/worm gear/motor assembly, in accordance with certain embodiments.

FIG. 4 illustrates another view of the slewing ring/worm gear/motor assembly, in accordance with certain embodiments.

Figure 5:
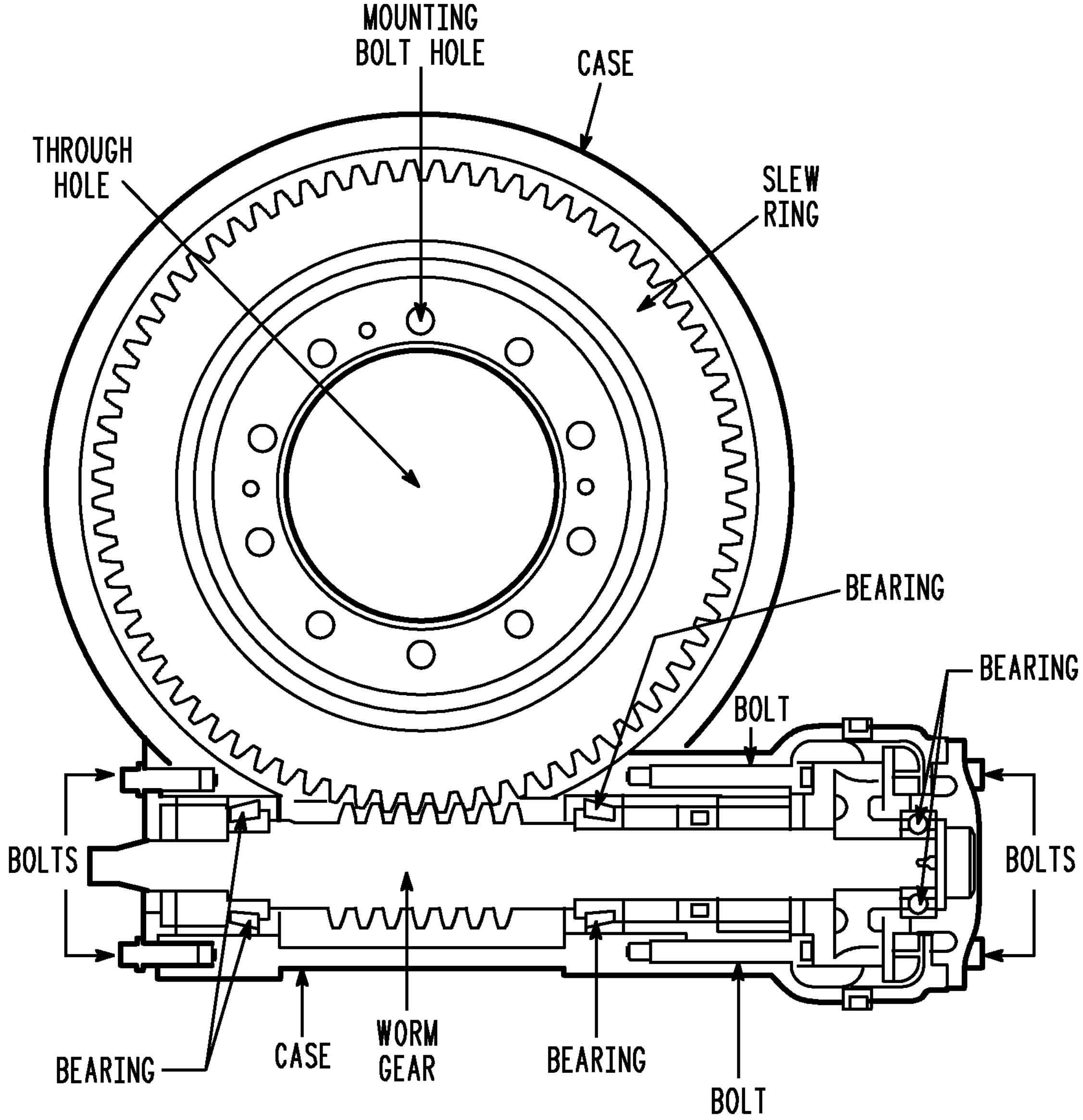
FIG. 5 illustrates a cross-sectional view of the Slewing Ring and Worm Gear assembly, in accordance with certain embodiments.

FIG. 5 illustrates a cross-sectional view of the slewing ring and worm gear assembly of the rotator element, in accordance with certain embodiments. The through-hole of the worm gear driven slewing ring, which allows a rotary joint coupled feed line to an antenna to be inserted, thereby providing for up to unlimited continuous rotation of an antenna to which the feed line is connected, is shown. The meshing of the worm gear driven slewing ring with the gear assembly of the worm gear is shown. The various bearings and bolts required to secure the assembly are illustrated.

Figure 6:
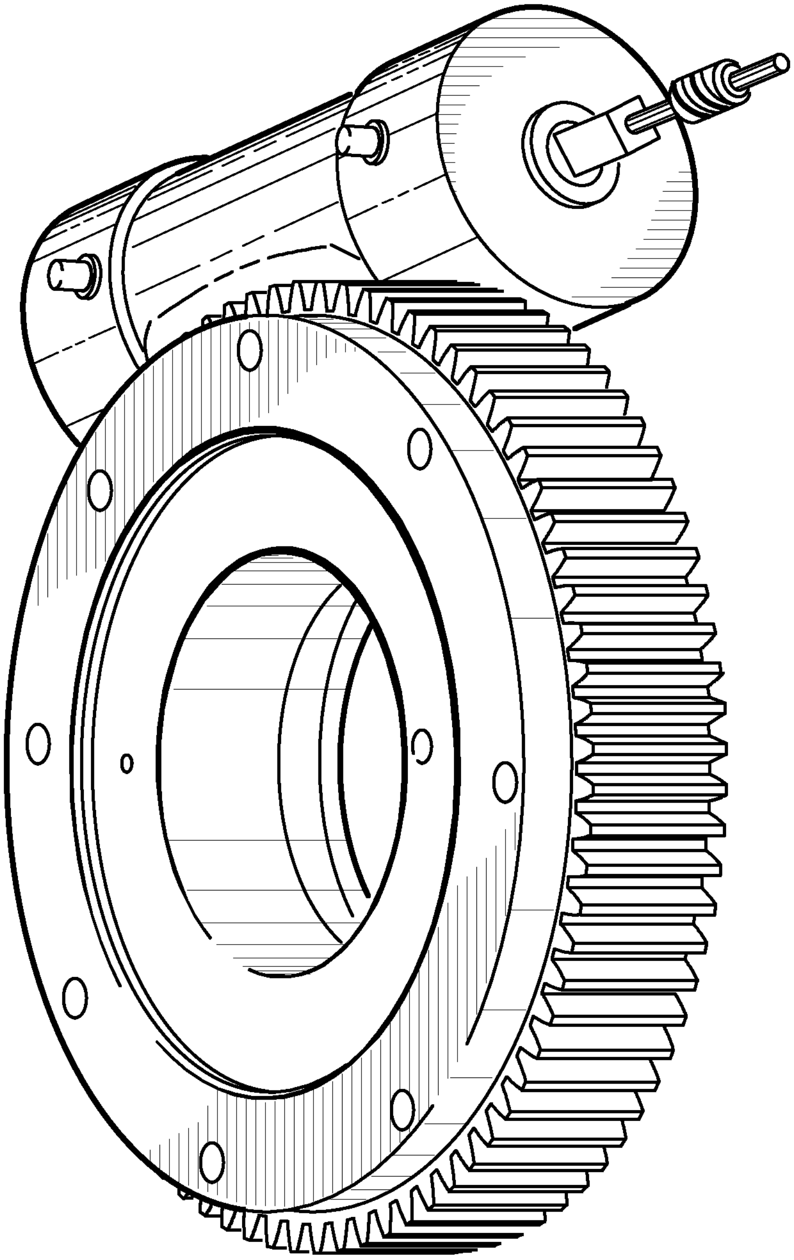
FIG. 6 is a top view of a Slewing Ring with through hole and the slewing gear shown, but without weatherproof protection, in accordance with various embodiments.

FIG. 6 is a top view of a worm gear driven slewing ring with through hole and the slewing gear shown, but without weatherproof protection, in accordance with various embodiments.

Figure 7:
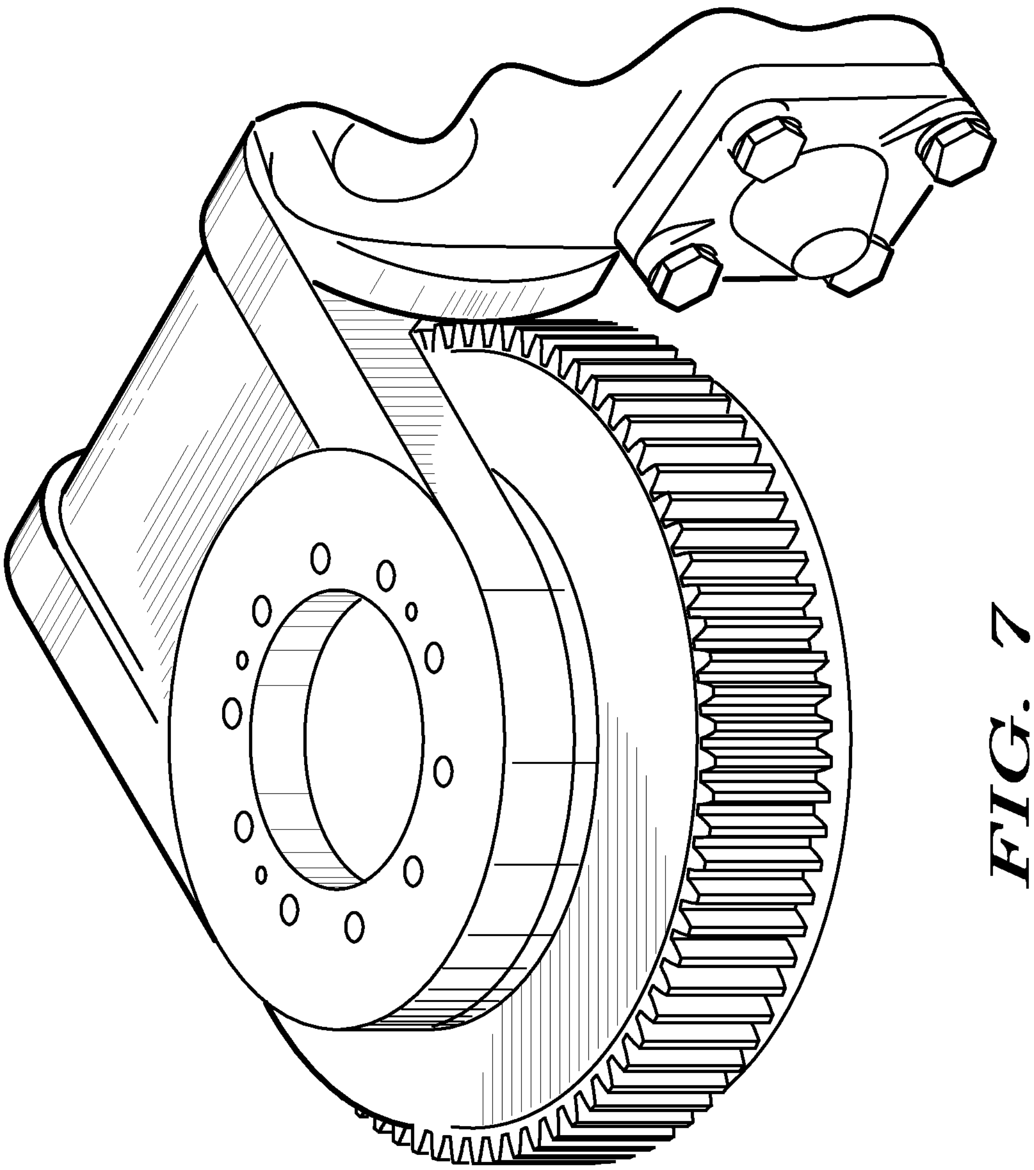
FIG. 7 illustrates a bottom/side view of a slewing ring with slewing gear and through hole, again without weatherproof casting, in accordance with various embodiments.

FIG. 7 illustrates a bottom/side view of a slewing ring with slewing gear and through hole, again without weatherproof casting, in accordance with various embodiments.

Figure 8:
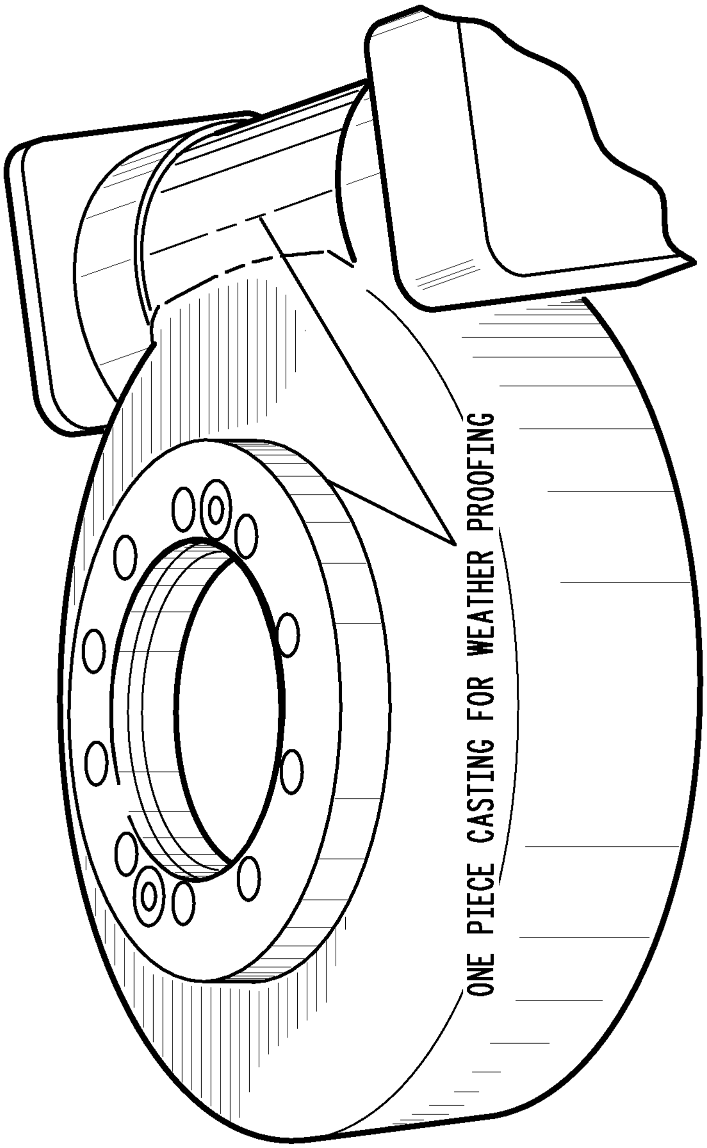
FIG. 8 shows a bottom view of a slewing ring with one piece cast iron metal casting, for weatherproof protection of the slewing ring, in accordance with various embodiments.

FIG. 8 shows a bottom view of a slewing ring with one piece cast iron metal casting, for weatherproof protection of the slewing ring, in accordance with various embodiments. This illustrates a weatherproof gear box of the worm gear of the rotator element.

Figure 9:
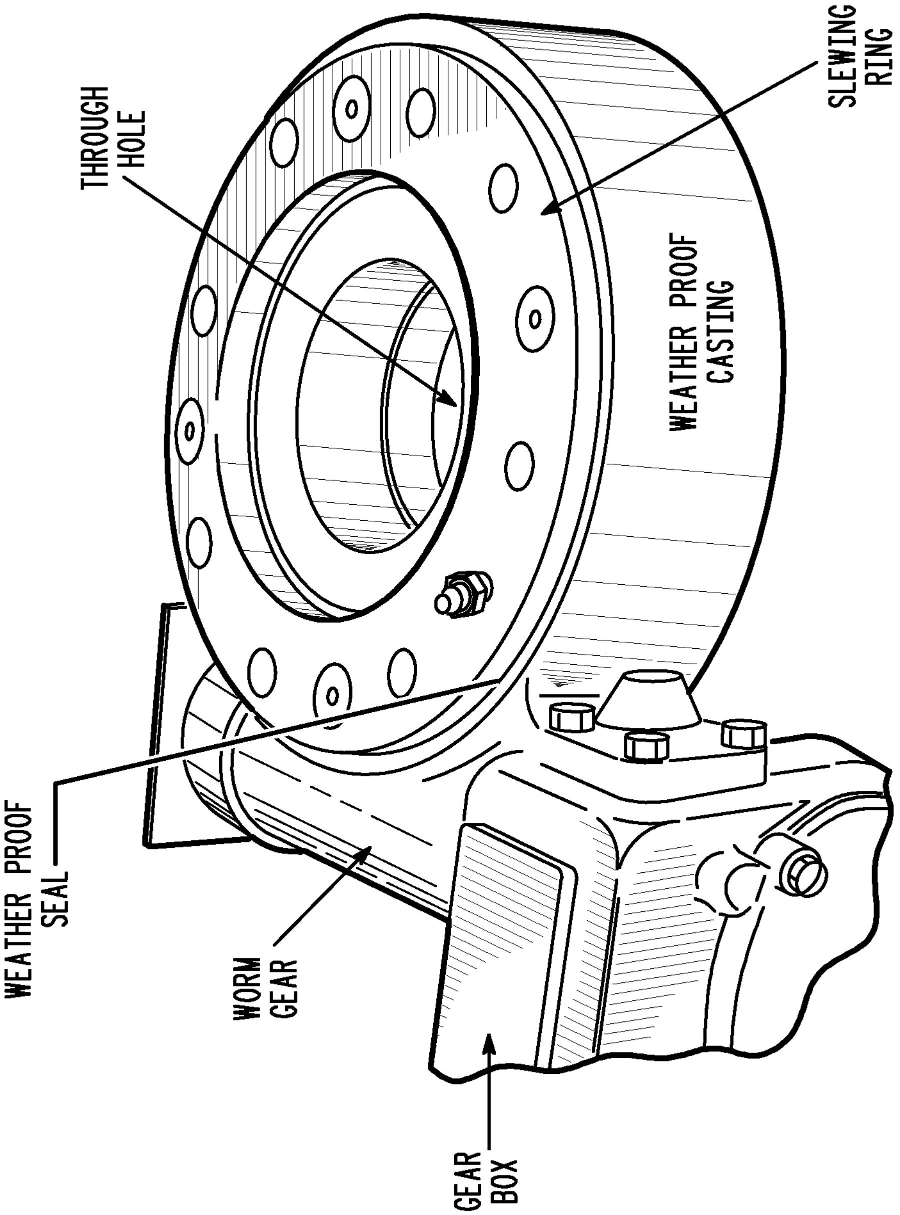
FIG. 9 illustrates a top view of a slewing ring with weatherproof metal casting cover and weatherproof seal and through hole, in accordance with various embodiments.

FIG. 9 illustrates a top view of a slewing ring with weatherproof metal casting cover and weatherproof seal and through hole, in accordance with various embodiments. The worm gear driven slewing ring is attached to the worm gear at the side and the gear box as shown.

Figure 10:
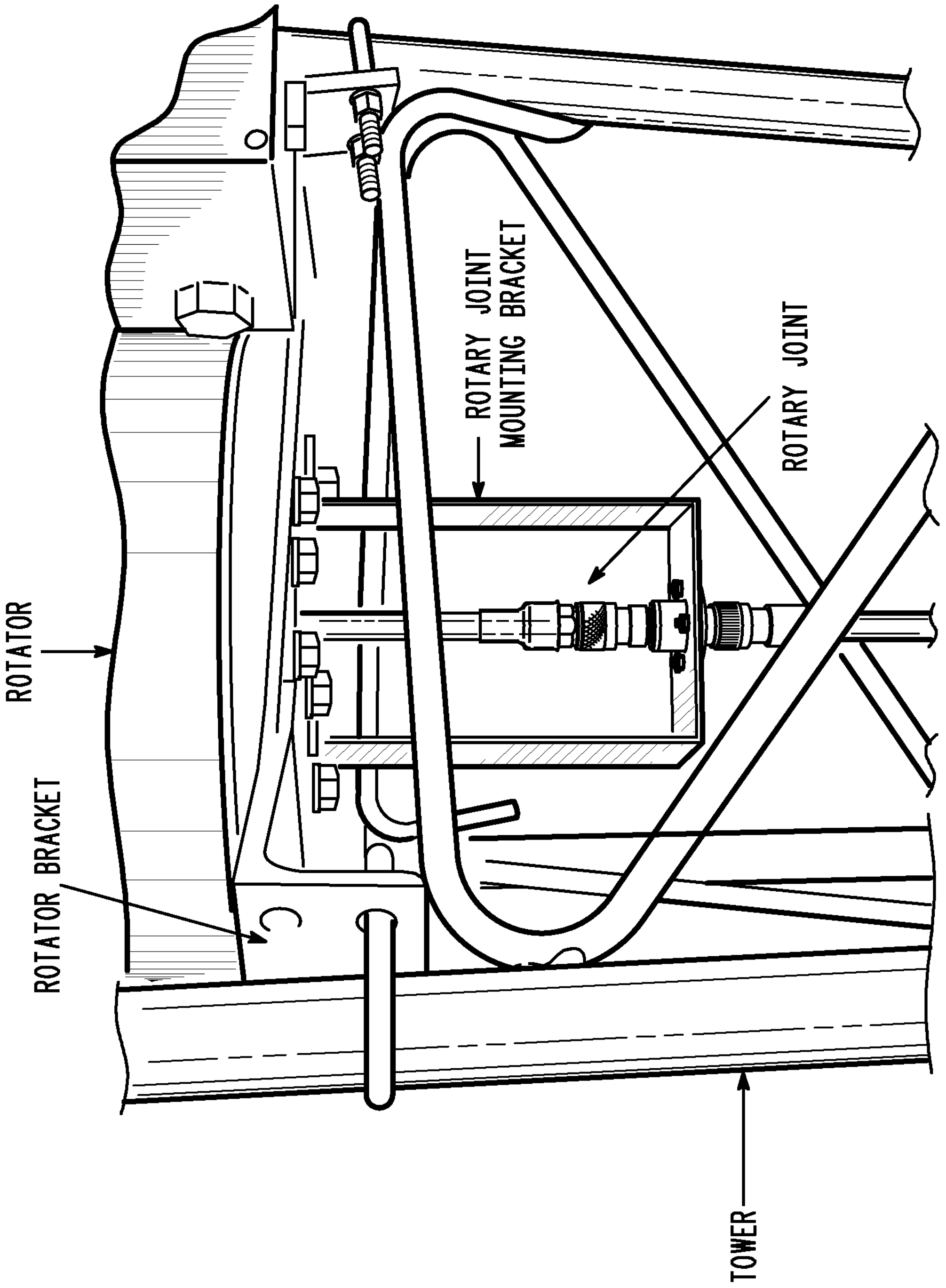
FIG. 10 illustrates a Rotary Joint with a coaxial cable passing through opening (through hole) in the slewing gear, in accordance with various embodiments.

FIG. 10 illustrates a rotary joint with a coaxial cable passing through opening (through hole) in the slewing ring gear, in accordance with various embodiments. Also shown are the rotator bracket, the rotator, the tower (or mast) rod, and the rotator joint mounting bracket. The feed line to the antenna is coupled with a rotary joint of the rotator element and the controller element controls the rotator element to continuously rotate about the rotary joint in either direction for an infinite number of turns.

Figure 11:
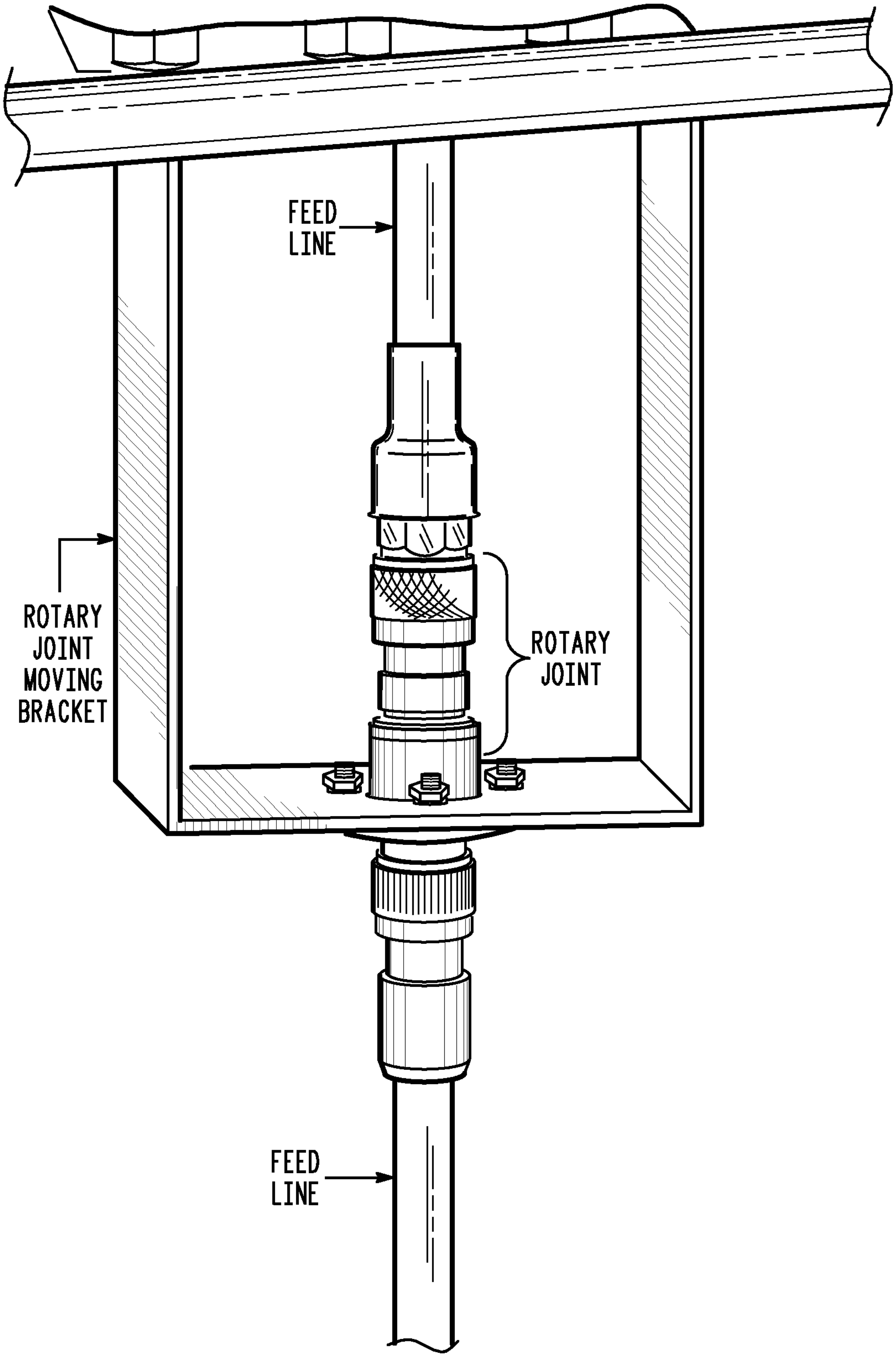
FIG. 11 shows a Rotary joint showing coaxial cable passing through opening (through hole) in slewing gear, in accordance with various embodiments.

FIG. 11 shows a rotary joint showing coaxial cable passing through opening (through hole) in slewing gear, in accordance with various embodiments. Also shown are the feed line, the rotary joint mounting bracket, the feed line and rotary joint.

Figure 12:
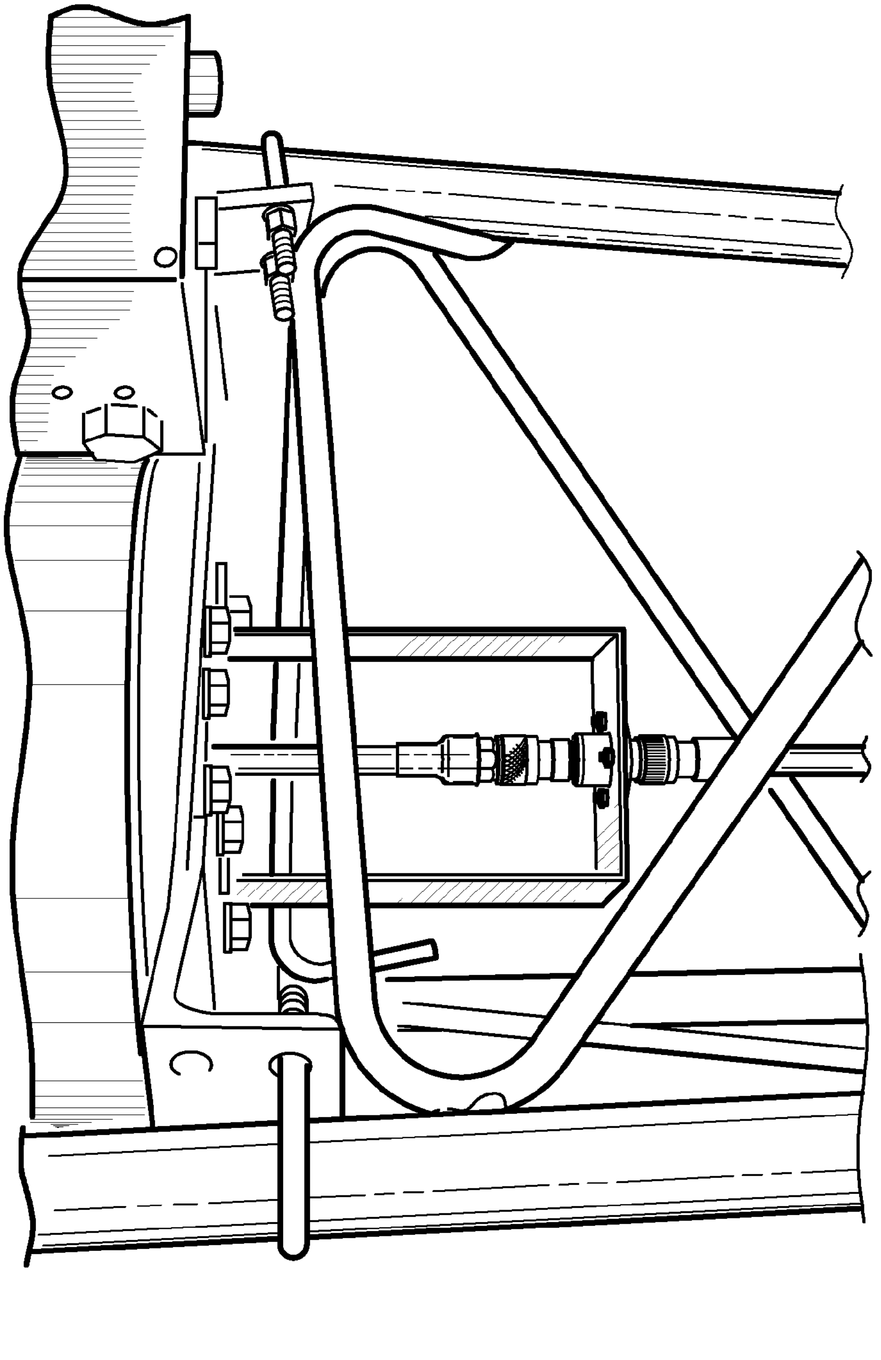
FIG. 12 shows a view of coaxial cable going through the slewing ring gear, connecting to the rotary joint and continuing up through the slewing ring, in accordance with various embodiments.

FIG. 12 shows a view of coaxial cable going through the slewing ring gear, connecting to the rotary joint and continuing up through the slewing ring, in accordance with various embodiments.

Figure 13:
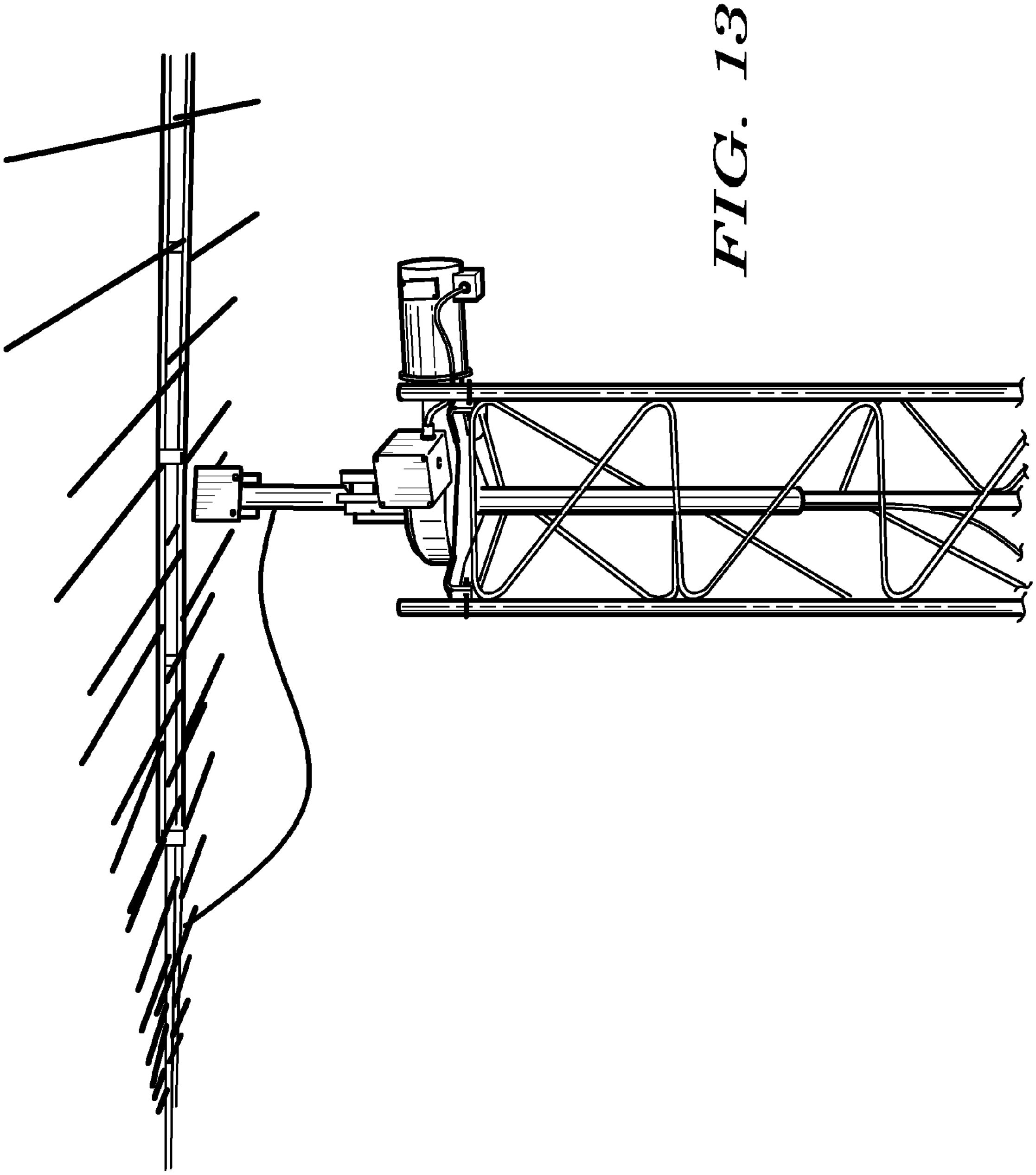
FIG. 13 illustrates a Broad Frequency Antenna mounted on a mast with a coaxial feed line going through the center of the slewing ring up the mast, in accordance with various embodiments.

FIG. 13 illustrates a Broad Frequency Antenna mounted on a mast with a coaxial feed line going through the center of the slewing ring up the mast, in accordance with various embodiments.

Figure 14:
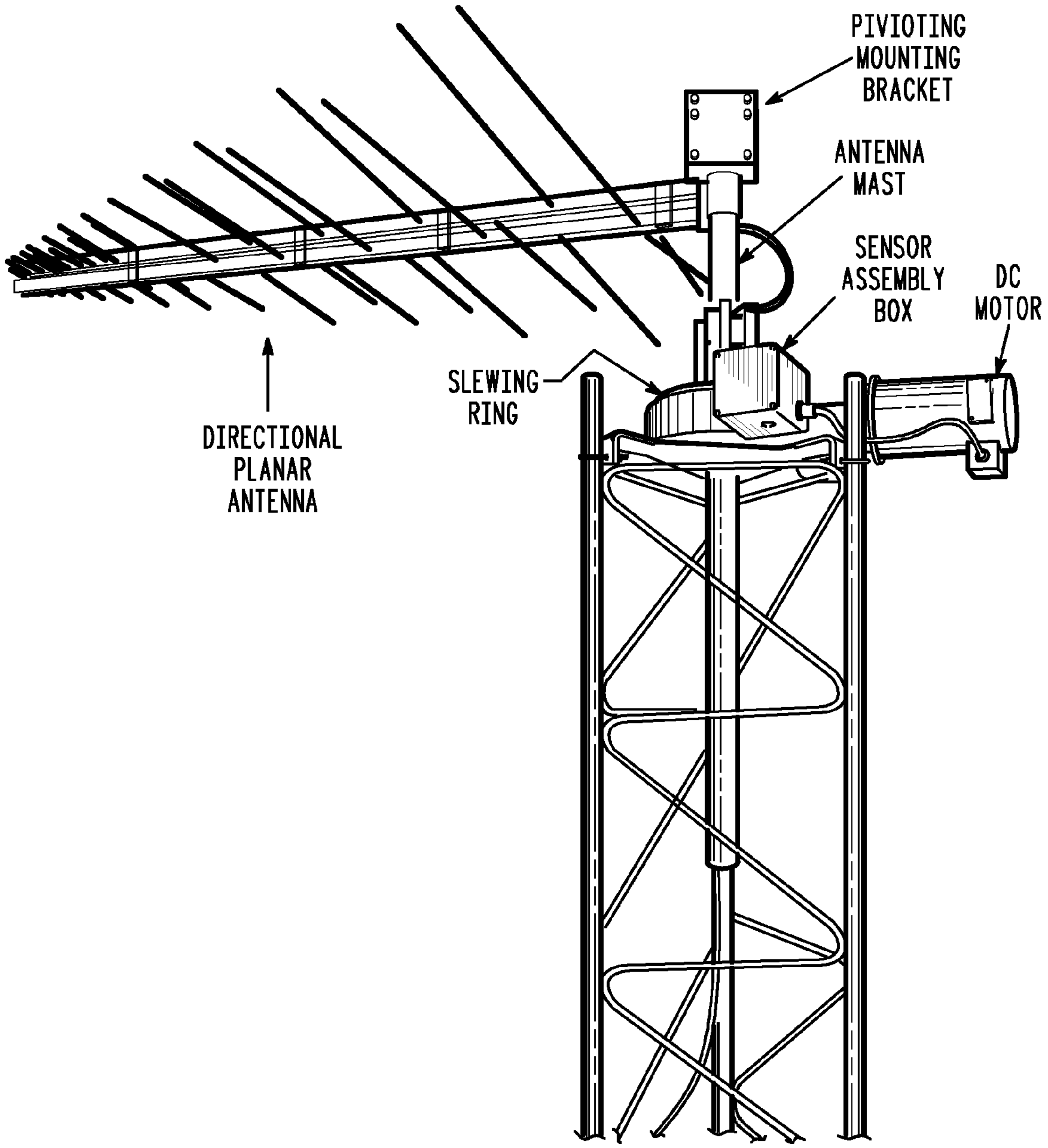
FIG. 14 shows a High-Frequency, Directional Planar Antenna mounted on a mast, in accordance with various embodiments.

FIG. 14 shows a High-Frequency, Directional Planar Antenna mounted on a mast, in accordance with various embodiments. This drawing illustrates a coaxial feed that cannot exit the top of the mast because of the presence of the old bracket at the top, but it does show coaxial feed inserted through the through hole of the rotator element. Also, the mast extends below the rotary assembly.

Figure 15:
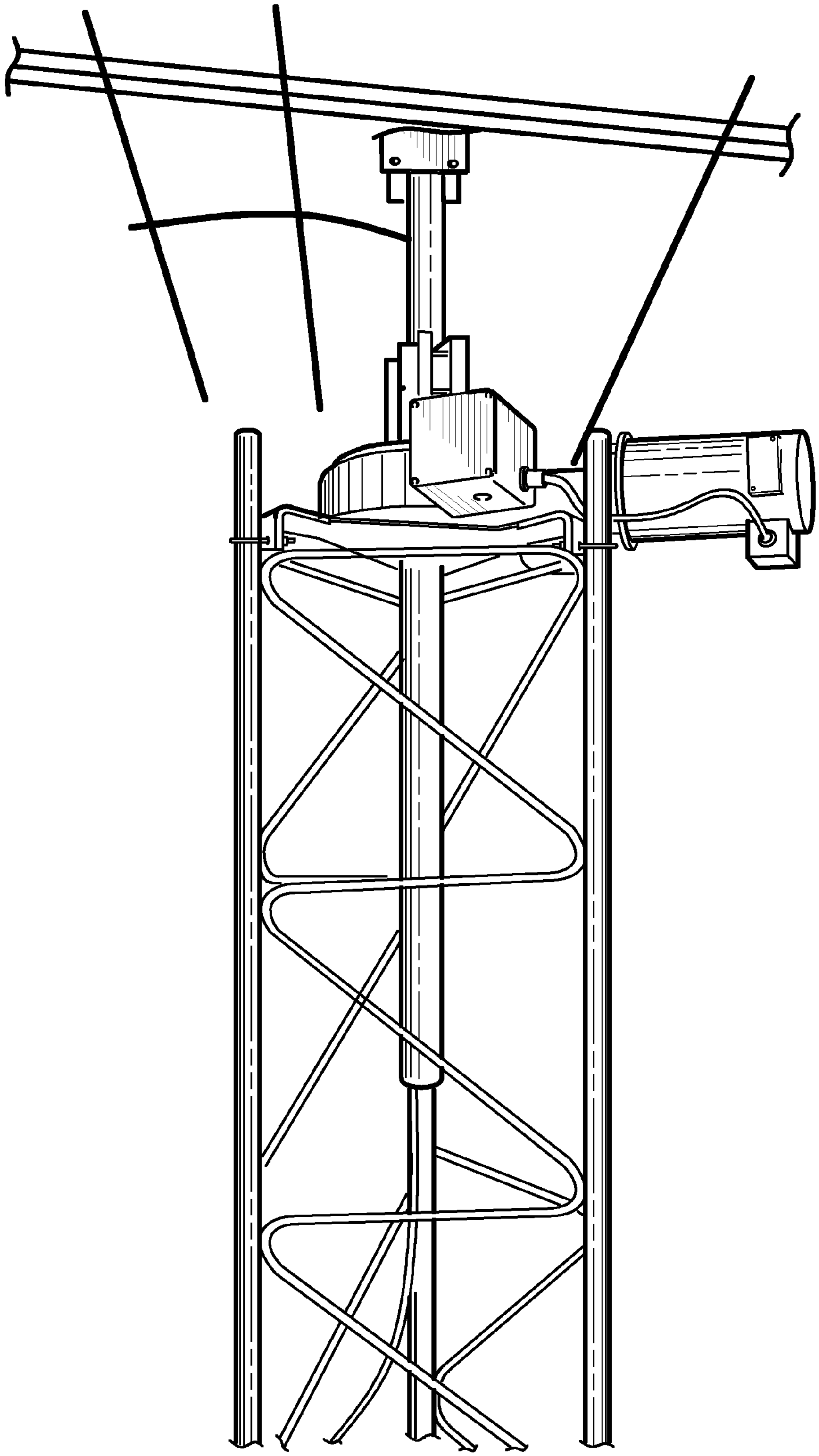
FIG. 15 illustrates an assembly comprised of a slewing ring attached to worm gear and sensor assembly, in a horizontal orientation, in accordance with various embodiments.

FIG. 15 illustrates an assembly comprised of a worm gear driven slewing ring attached to a worm gear and sensor assembly, in a horizontal orientation, in accordance with various embodiments. This illustrates that the worm gear may be a horizontally oriented worm gear; as previously discussed, the worm gear may be vertically or otherwise oriented. A coaxial feed line extends up through the through hole in the slewing ring.

Figure 16:
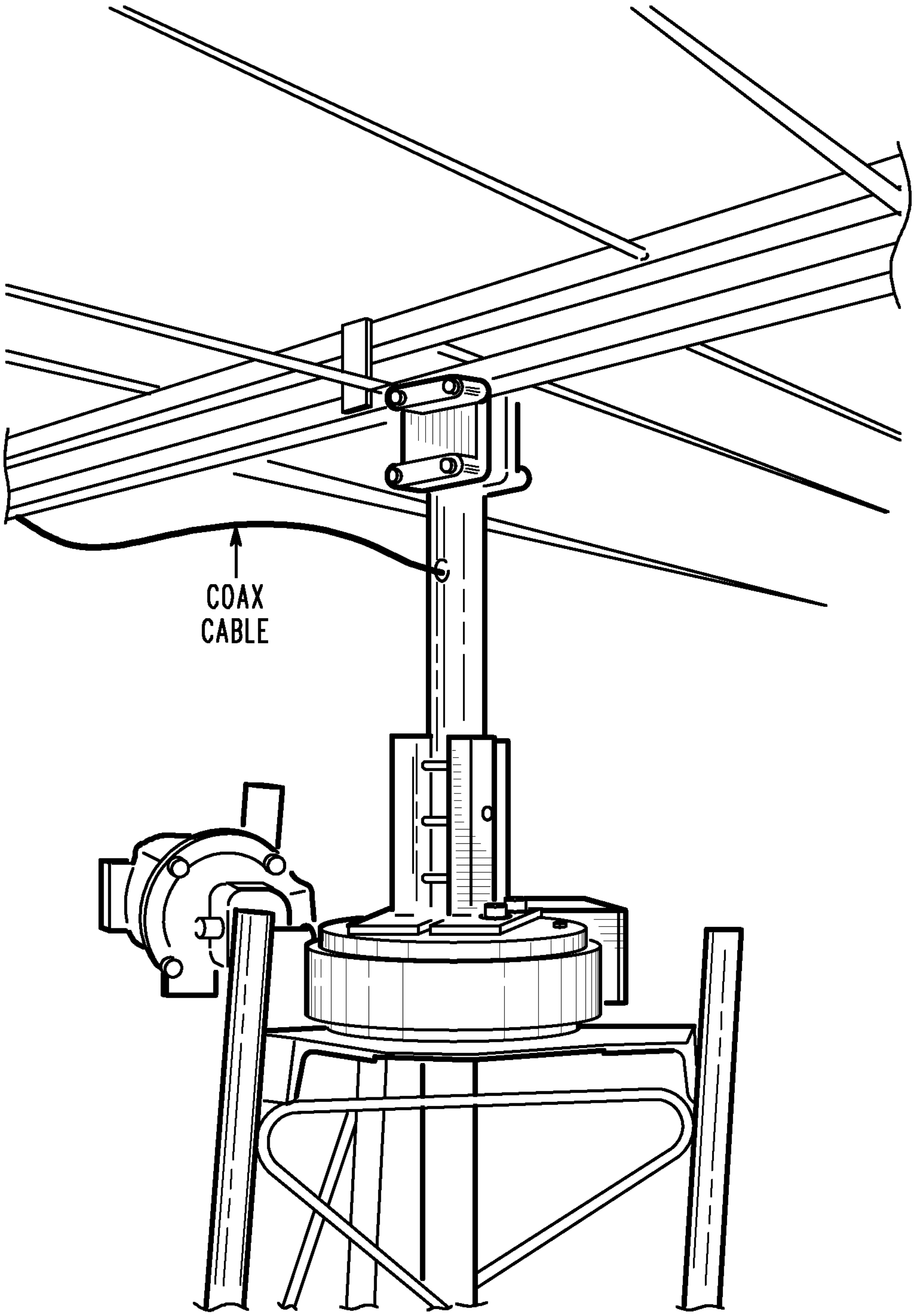
FIG. 16 shows a coaxial feed exiting the side of the mast, after coming up the through hole of the slewing ring, in accordance with various embodiments. This side exit is prompted by the top of mast, which is blocked.

FIG. 16 shows a coaxial feed exiting the side of the mast, after coming up the through hole of the slewing ring, in accordance with various embodiments. This side exit is prompted by the top of mast, which is blocked.

Figure 17:
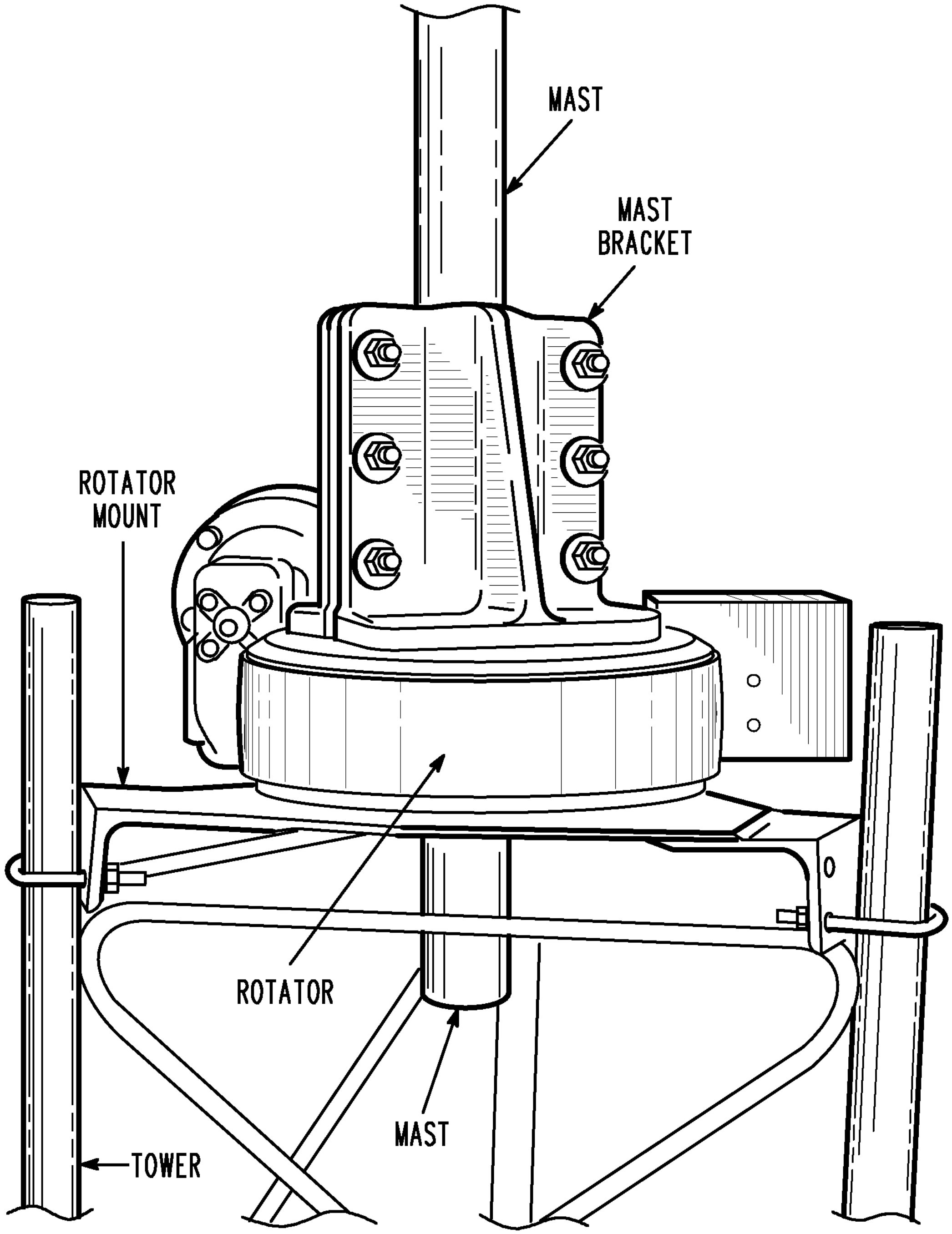
FIG. 17 is an illustration showing an antenna mast partially below a slewing ring, in accordance with various embodiments.

FIG. 17 is an illustration showing an antenna mast partially below a slewing ring, in accordance with various embodiments.

Figure 18:
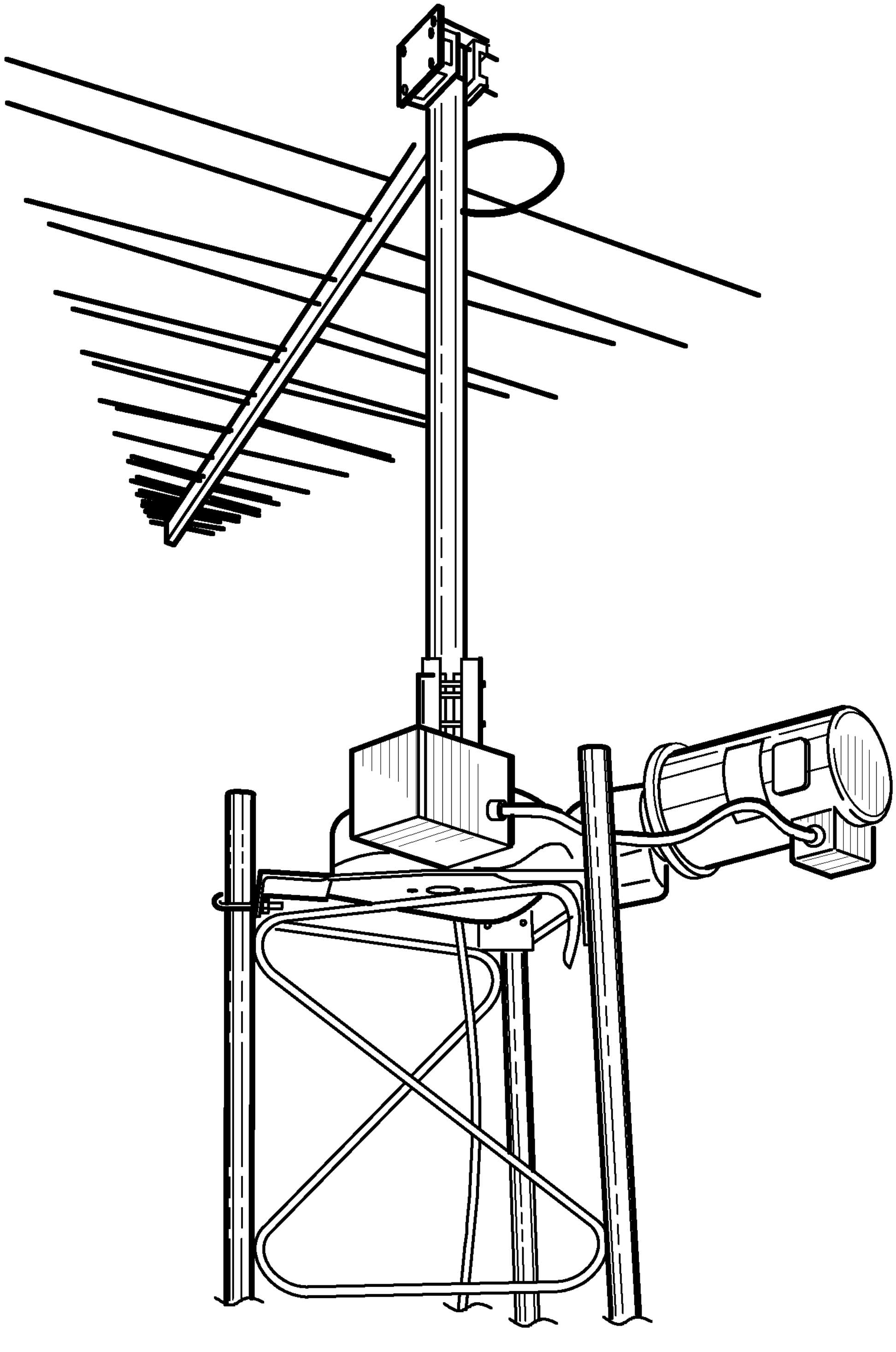
FIG. 18 illustrates an antenna mast not extending below the horizontal plane of the slewing ring through hole, in accordance with various embodiments.

FIG. 18 illustrates an antenna mast not extending below the horizontal plane of the slewing ring through hole, in accordance with various embodiments.

Figure 19:
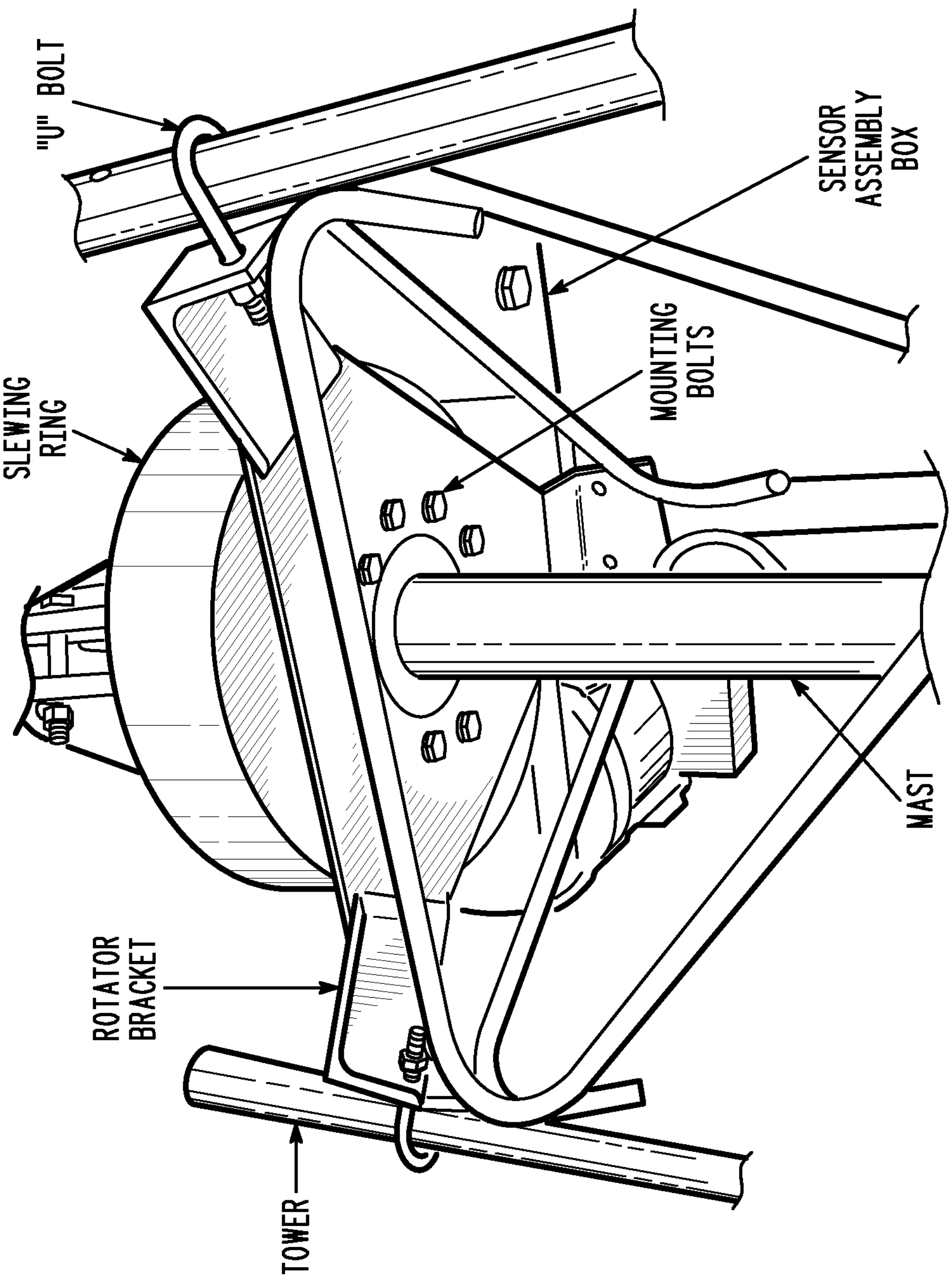
FIG. 19 illustrates installation of antenna mast up through underside of the rotary below the rotator element, in accordance with various embodiments.

FIG. 19 illustrates installation of the antenna mast from the underside, below the rotator element, in accordance with various embodiments. The mast can be seen going through the through hole of the slewing ring of the rotator element. Installation may also be from above the rotator element.

Figure 20:
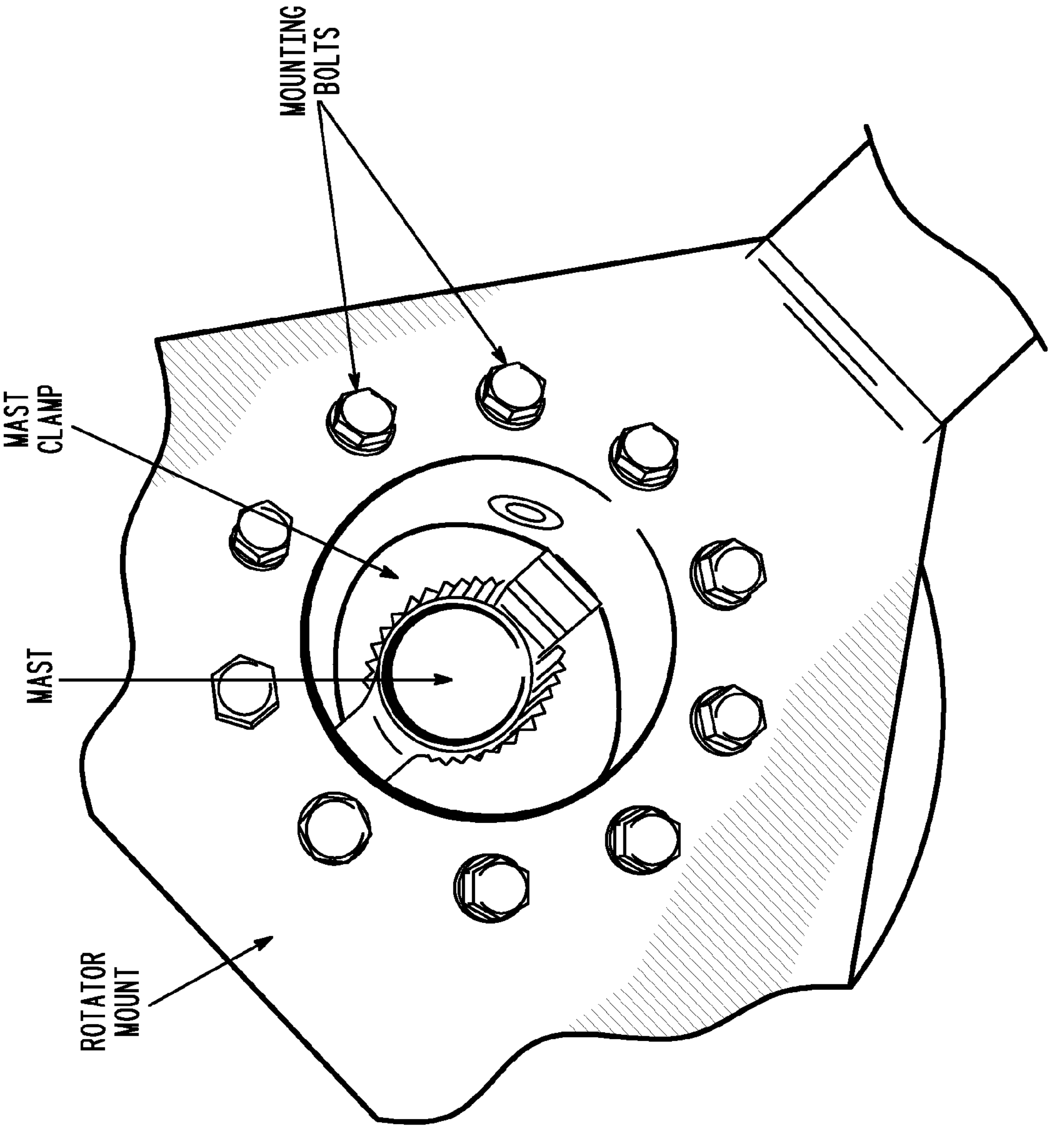
FIG. 20 illustrates an antenna mast not extending below the rotator element, in accordance with various embodiments.

FIG. 20 illustrates an antenna mast not extending below the rotator assembly element, in accordance with various embodiments. The antenna mast can be seen even with the slewing ring hole.

Figure 21:
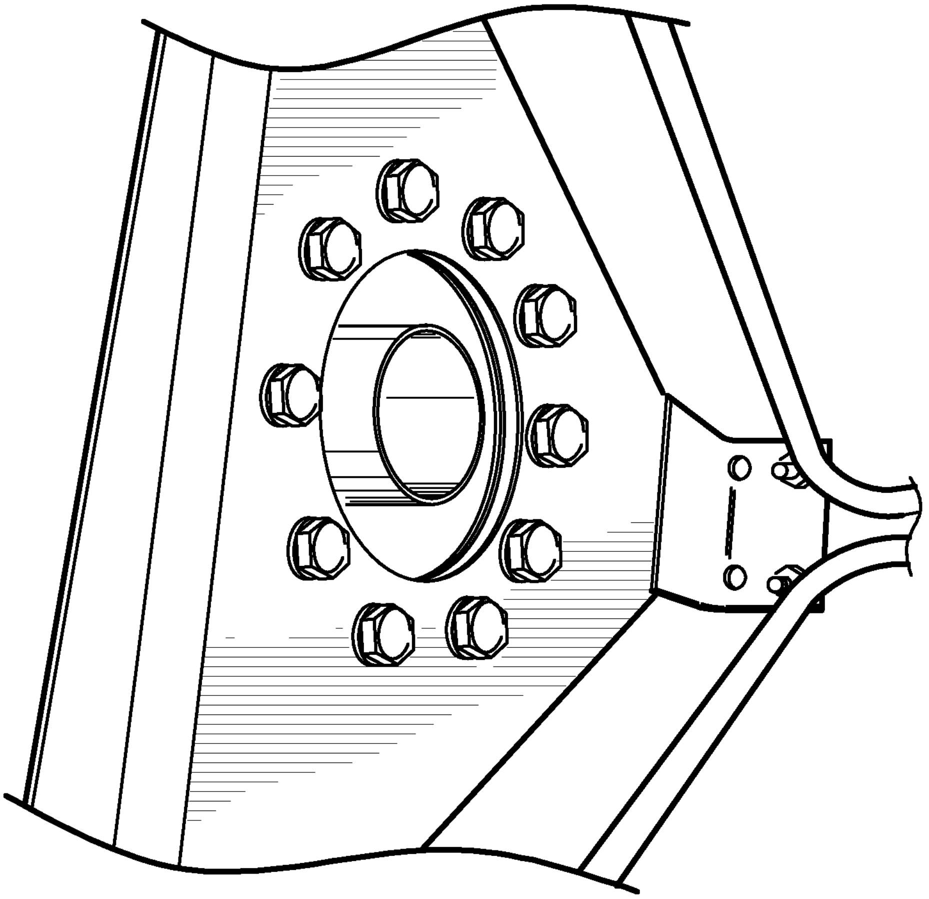
FIG. 21 illustrates an antenna mast flush with the bottom mounting plate of the rotator assembly element, in accordance with various embodiments.

FIG. 21 illustrates an antenna mast flush with the bottom mounting plate of the rotator assembly element, in accordance with various embodiments.

Figure 22:
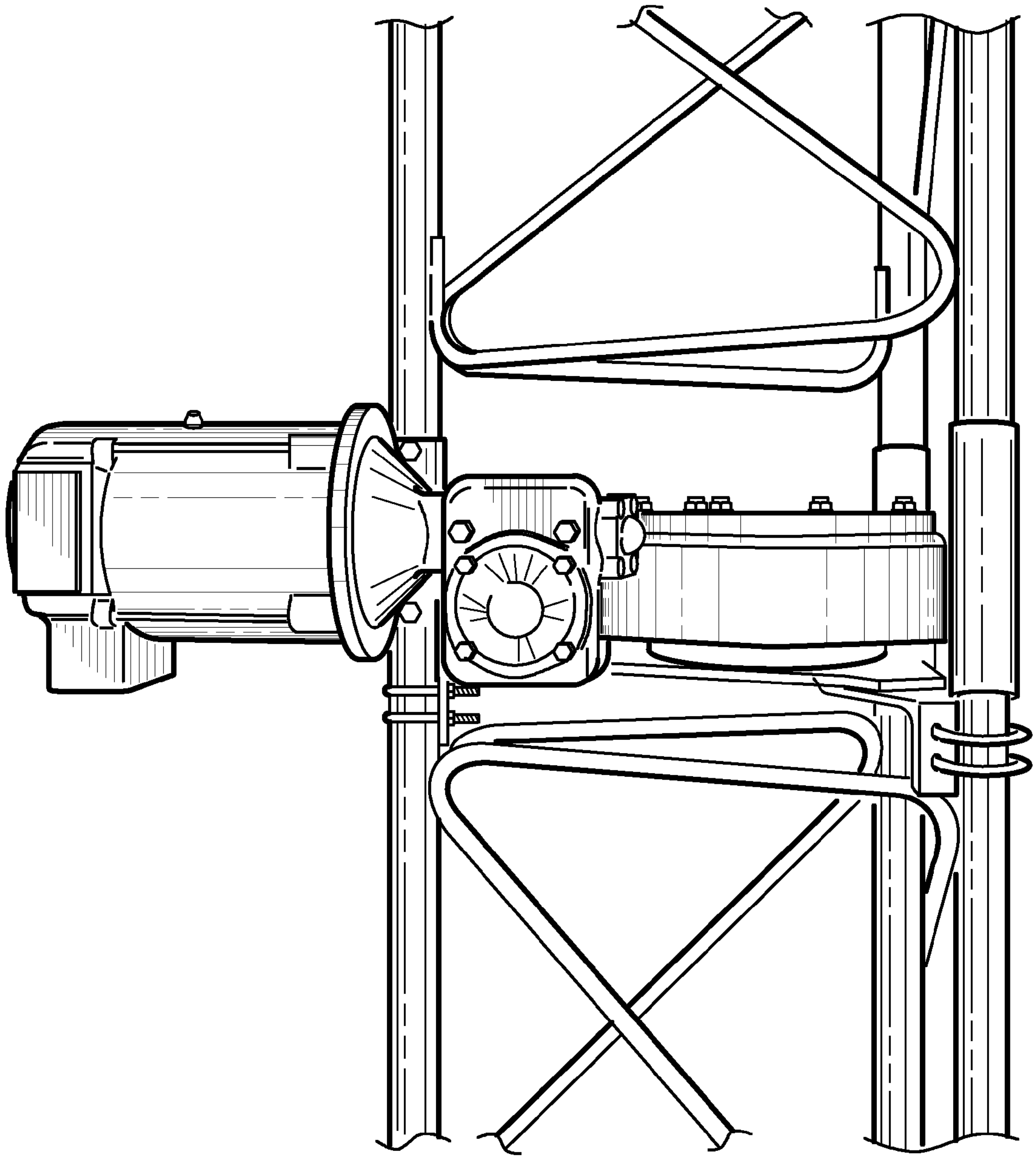
FIG. 22 illustrates that a rotator element may have small dimensions such as might fit into a small section of the antenna tower, in accordance with various embodiments.

FIG. 22 illustrates that a rotator element may have small dimensions such as might fit into a small section of the antenna tower. For example, the rotator element may have dimensions that fit within an 18 inch face width tower section splice.

Figure 23:
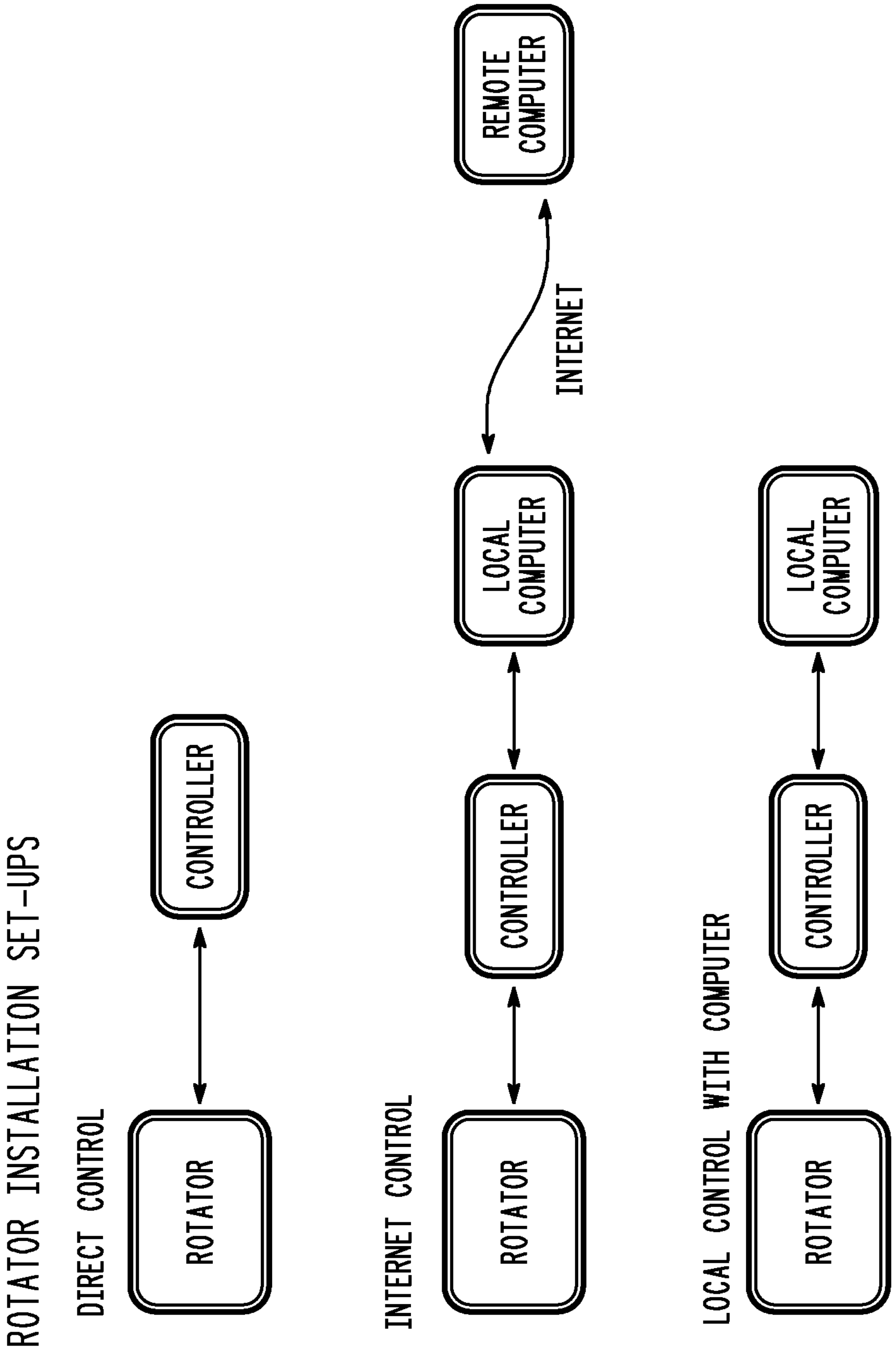
FIG. 23 illustrates various embodiments of rotator installation set-ups, including for direct control, Internet (network) control, and local control with a computer, in accordance with various embodiments.

FIG. 23 illustrates various embodiments of rotator installation set-ups, including for direct control, Internet (network) control, and local control with a computer, in accordance with various embodiments.

Controller Element

Theory of Operation

The controller element provides the motor control and direction feedback systems for the “rotator”. It is fully contained with power supply for 115/230 Volt, 50/60 Hz operation. At the heart of the controller is a Microchip PIC microcontroller (CPU) containing 32 KBytes of Flash Memory for program storage, and 256 Bytes of EE Prom memory for retention of parameters and settings that need to be retained.

The controller element accepts motion commands from front panel pushbuttons, the “Point and Shoot” knob, or computer commands from either its EIA-232 port or USB port located on the rear panel. The CPU determines which direction the rotator needs to turn, and the distance it needs to travel to get there generating the necessary PWM (Pulse Width Modulation) signals that drive the motor. The CPU then monitors the position of the rotator and ramps up the PWM and down the PWM as required in order to gently start and stop the rotator and antenna at the desired direction azimuth heading.

DC motor voltage is supplied from the built in 48 VDC supply and routed through relays in the desired polarity to the rear panel connection terminals 1 and 2. The motor return circuit is completed by a fully protected MOSFET driven from the CPU PWM signal. This provides the precise speed control for the rotator motor.

Rotator position feedback is monitored as a function of the output voltage of the magnetic absolute sensor mounted at the rotator. The controller provides +12 VDC from the rear terminal 5 to power the sensor, and measures the sensor output on terminal 4. This sensed voltage (0.25 to 4.75 VDC) is actively filtered to remove noise and then applied to the CPU’s internal 10 bit A/D converter for determining the current rotator position in degrees. A 4×20 character backlit LCD display is utilized to provide visual indication of all operating conditions and the rotator’s current heading. This display gets data serially from the main CPU, and translates this data into row and column data necessary to drive the LCD. Precision output from the sensor and tight component tolerances eliminate any need for calibration of this system other than aligning the antenna mechanically to the indicated direction.

Controller Element Software Configuration (Software SETTINGS)

This procedure assumes that the SETUP parameters are all at factory default. If you wish to assure this condition, press and hold CANCEL+CCW+CW as described in 2.1.5 until the display indicates RESET EE.

1. Go into SETUP Mode as follows:
   - Press and hold the SETUP/ITEM button until SETUP appears on the display.
   - Choose the OPTION parameter by repeatedly pressing and releasing the SETUP/ITEM button until the display shows OPTION.
2. Choose the correct OPTION by rotating the heading knob until the “New Value=” the correct option for your rotator, as defined in the Appendix A., is displayed.
   - ROTARY—For systems employing a rotary joint and a point on demand antenna system that turns the shortest route.

FOREVER—For systems employing a rotary joint and continuously rotates as a radar system.

LIMITS—For systems NOT employing a rotary joint, and therefore incorporates end point soft limits and must NOT turn through the limits ≦360°, then backwards.

No other rotator has option of all three.

3. When the correct option for your system is displayed, save it as follows:

Press the CHANGE button to change it.

Press the SAVE button to store the change and exit.

Synchronize (Calibrate) the Direction Sensor

OPTION=ROTARY

Turn the rotator system using the CW or CCW buttons until the physical direction of the antenna is pointed to true SOUTH using a compass. Loosen the sensor and rotate the sensor until the heading indicator on the controller is 180 degrees, then tighten.

OPTION=FOREVER

Temporarily, change the OPTION to ROTARY, then follow the directions above. After completion, restore the OPTION to FOREVER

OPTION=LIMITS

Turn the rotator system using the CW or CCW buttons until the physical direction of the antenna is pointed to the desired center of rotation using a compass. This will normally be either SOUTH (OFFSET=0) or NORTH (OFFSET=180).

OPTION Parameter

The OPTION parameter setting provides the correct start-up conditions for your system and makes items that pertain to your rotator accessible in the SETUP menu. The controller element supports the following OPTION values:

ROTARY—Shortest Path

The ROTARY option is selected when you have purchased a continuous rotation model, and installed a rotary joint in the coax line. The rotator will go to the selected or programmed heading via the shortest path.

FOREVER—Forever Rotating

The FOREVER option is selected when you have purchased a continuous rotation model, and installed a rotary joint in the coax line. Once in this mode select either the CW or CCW switch. The rotator will continue to rotate in that direction until the CANCEL switch is pressed.

LIMITS—360 degree nominal rotation range

The LIMITS option is used if you purchased a non-continuous rotation model WITHOUT the installation of a rotary joint in the coax line. This option will limit rotation beyond the nominal 360 degrees+/−the soft limit allowances.

To setup the OPTION parameter, perform the following steps:

Enter SETUP mode.

Press and hold down the SETUP/ITEM button for 2 seconds.

Release the SETUP/ITEM button when SETUP appears on the display.

Choose the OPTION parameter.

Repeatedly press and release the SETUP ITEM button until SETUP-OPTION=is displayed.

The currently set option will be displayed after the equals sign (=).

The bottom line on the display will indicate NEW VALUE=XXX.

Set the OPTION parameter for your rotator.

Rotate the heading knob until the desired OPTION is displayed after NEW VALUE=on the display.

Press the CHANGE button to store the New OPTION.

Press the SAVE button to save the option and exit the SETUP menu.

RAMP—Adjusts the variable ramping, (0-9) of the speed control features of the controller. 0=shortest, 9=longest ramp. Generally, the larger your system, the longer ramp up and down you will want to use. Default is 3. If MAX SPEED=11, ramping is disabled regardless of the ramp setting.

Figure 26:
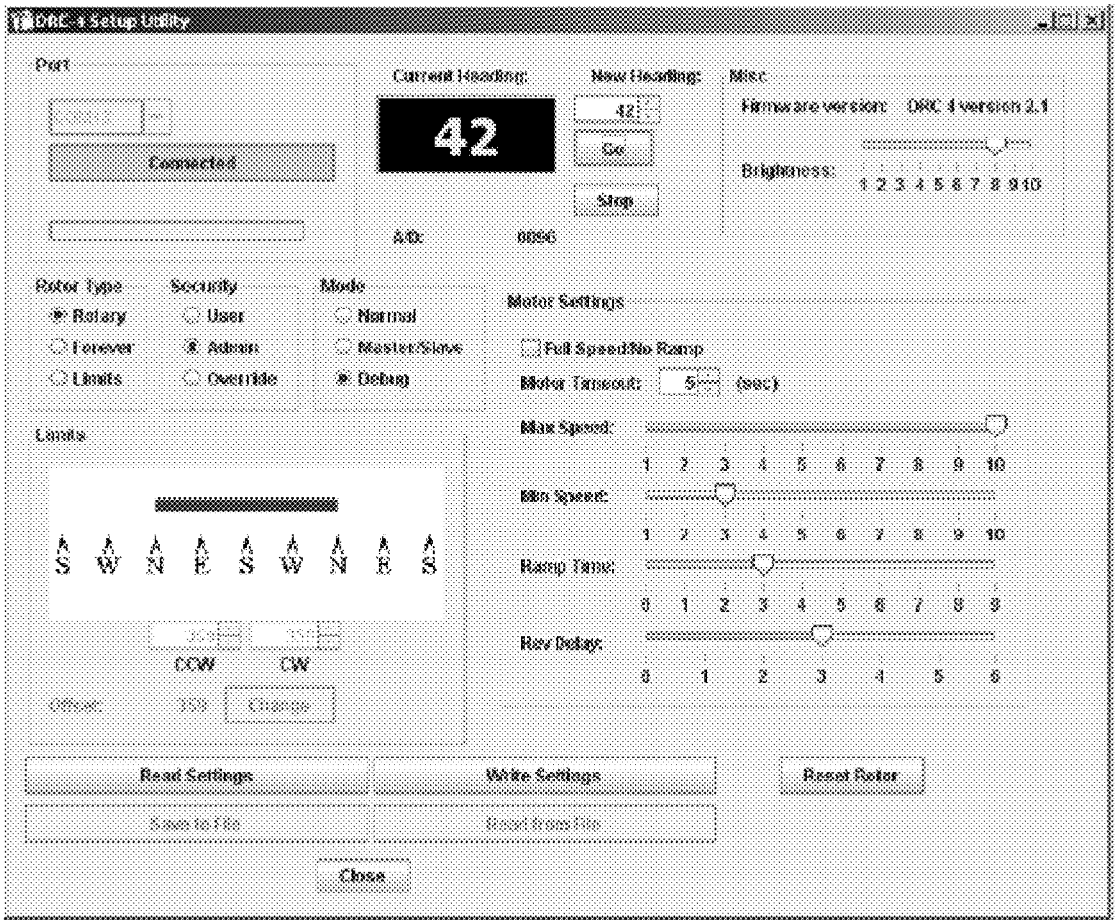
FIG. 26 illustrates an exemplary graphical user interface (GUI) for use by a user during a set-up mode, in accordance with various embodiments.

An exemplary graphical user interface (GUI) for use by a user during the set-up mode, such as to select a Rotary, Forever, or Limits Option, set specifics of the Ramp Features like Ramp Time, or maximum/minimum Speed of Rotation of the worm gear that slewing ring, can be seen in the GUI in FIG. 26.

Server

As illustrated in FIG. 22, there are various embodiments contemplated for rotator control. There is direct control in which a rotator element directly interfaces with a controller. There is network or Internet control in which a remote computer may interface with a local computer via a network, such as the World Wide Web or Internet, to interface with a controller. There is local control with a computer in which the computer is locally coupled to the controller. We will now discuss control via a network, which may be the Internet, in this section.

Server manages communication between remote rotator controllers over a TCP/IP network and physically connected rotators. The interface is built upon two primary windows: the IP Server window, which manages the TCP/IP connections, and the Rotator Manager window, which is responsible for configuring the modem connection to the controller. Other windows handle housekeeping and diagnostic utilities.

IP Server Window

Figure 27:
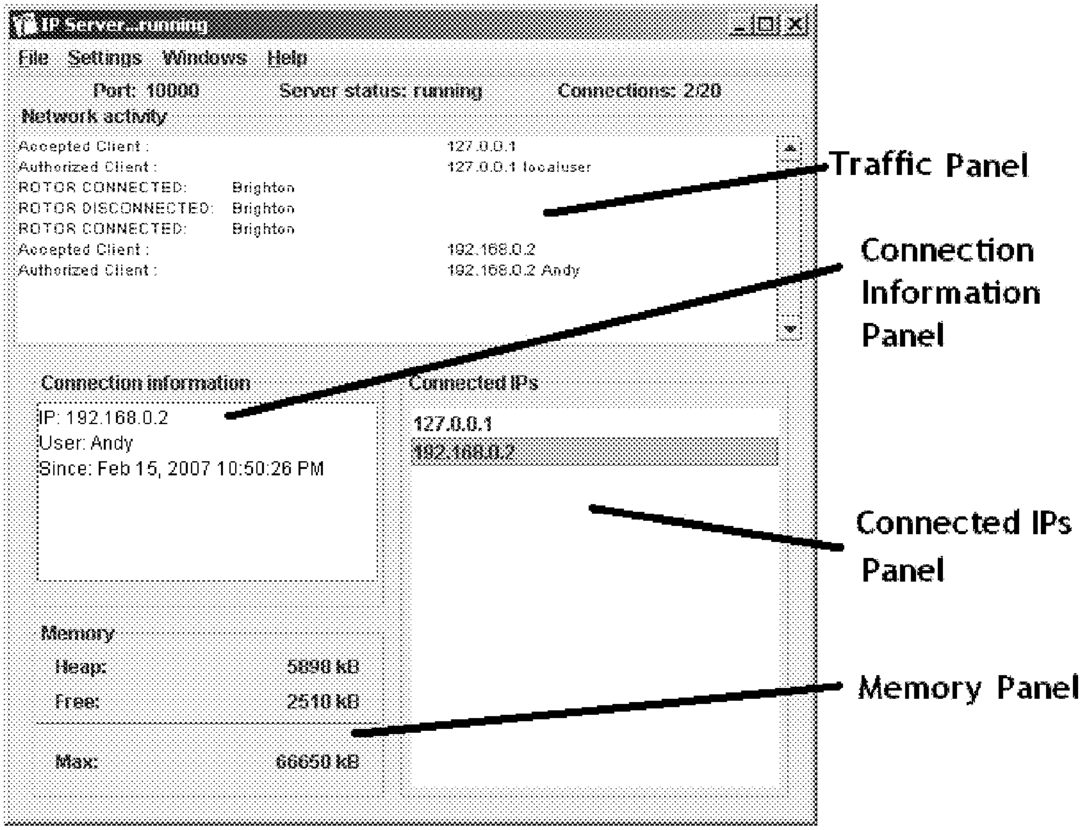
FIG. 27 illustrates a GUI screenshot of an IP Server window in Server, in accordance with various embodiments.

The IP Server window is displayed at program startup. It is responsible for managing TCP traffic. It serves as the main program window from which all others can be accessed. A GUI screenshot illustrates connected IP addresses in FIG. 27, an IP Server window in Server. FIG. 27 is a display showing two users out of twenty possible users (one is the local controller; the other is located on the LAN at IP address 192.168.0.2.

There are five main panels in the IP Server window FIG. 27.

Status Panel—The status panel is located at the top of the screen and shows the TCP/IP port that this server is listening on, whether the server is running or not, and how many controllers are connected out of the maximum allowed.

Traffic Panel—Shows traffic from different IP addresses, such as commands to turn and stop the rotators. It also shows alerts when a controller connects or disconnects, as well as when rotators are connected and disconnected from the server.

Connected IPs Panel—Shows all connected controllers by IP address. The user can select an address in the list to show its details in the Connection information panel.

Connection Information Panel—Displays detailed information about the selected connection from the Connected IPs Window. This information includes the IP address/hostname of the connection, the user who is logged in, and when the connection was established.

Memory Panel—Shows memory usage in the program.

| | | Menus |
|---|---|---|
| File: | Exit | Quits the program |
| Settings: | TCP/IP | |
| | Set Port: | Sets the TCP/IP port number for incoming connections. This option is only available when the server is stopped. |

-continued

| Menus | | |
|---|---|---|
| | Max connections: | Sets the maximum number of connections this server will allow. Note that the local connection (127.0.0.1) counts as one connection. |
| | Start Server: | Starts the server. When the server is running it will accept incoming connections from controllers. The server is automatically started when the program is launched. |
| | Stop Server: | Stops the server. When stopped the server will not accept incoming connections requests. In addition, stopping the server will close any existing TCP/IP connections that have already been established. |
| | Users and Passwords: | |
| | Manage Users: | Opens the User Manager Window |
| | Change Master Password: | Opens a dialog for changing the server's master password |
| | Edit Preset Locations: | Opens dialog for editing preset locations |
| | Server Location: | Opens dialog for editing the server's latitude and longitude |
| | Restore Defaults: | Resets the server to default configuration. This does not affect preset locations or passwords. |
| Window: | Show Controller: | Opens the local rotor controller |
| | Show Rotor Manager: | Opens the Rotor Manager Window |
| Help: | Help | Opens Help file |
| | About | Displays information about the software |

Local Controller

Server provides a local rotator controller similar in functionality to interface provided by the USAP Controller software. The main difference is that the local controller only provides access to the locally connected rotators. When the Server software is started the local controller is connected to the local loopback address (127.0.0.1), thus giving access to the locally connected rotators. Only one local controller (127.0.0.1) can have access to the rotator at anytime.

Figure 28:
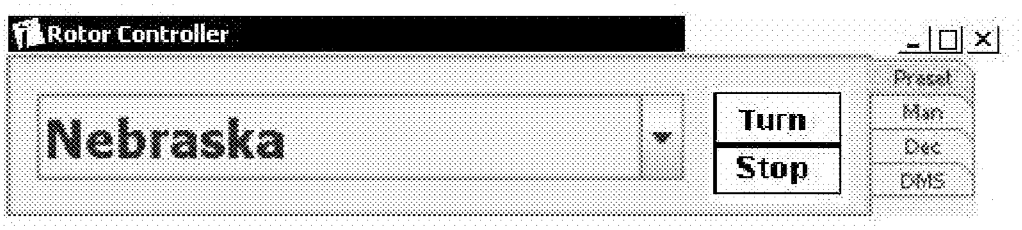
FIG. 28 illustrates a preset GUI window of a local controller in Server, in accordance with various embodiments.

To display the local controller, choose "Show Controller" from the "Window" Menu. A preset GUI window is shown in the local controller in Server of FIG. 28.

Editing Preset Locations

Figure 29:
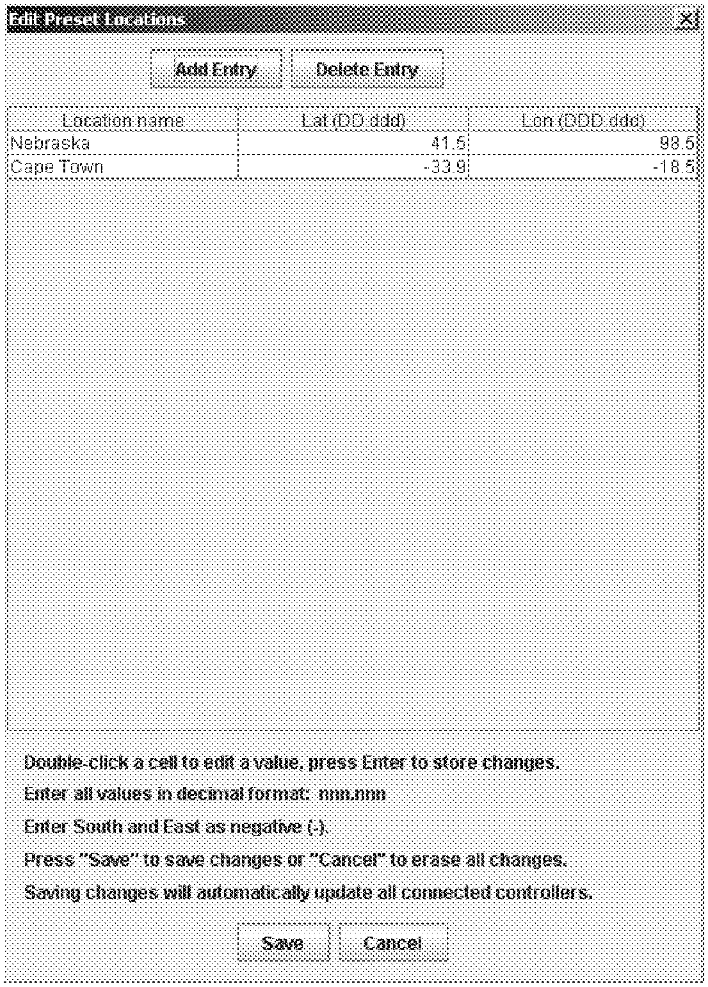
FIG. 29 illustrates an Edit Presets window of a GUI that allows for editing preset locations, in accordance with various embodiments.

The Server keeps a list of preset locations, as shown in the Edit Presets window of FIG. 29. The names of the locations are sent to each controller that is connected to the server. The locations are stored by latitude and longitude. This information is used in conjunction with the server latitude and longitude to calculate rotator headings to the preset locations.

NOTE: To ensure that the preset locations are accurate, the server's latitude and longitude are set in the Settings/Server Location menu in the IP Server Window. The server's latitude and longitude are set in decimal degrees to 3 decimal places. Conversion programs are readily available on the internet.

To add a preset location:

1. Press the "Add Entry" button. This will add a row to the bottom of the table with the name "new".
2. Double click the name and enter the name of your location. Press Enter when finished entering the name.

NOTE: It is possible to enter information into all cells directly, but the information will not be retained if you do not double click to enter the cell and press enter to exit the cell.

3. Double click the "Latitude" cell and enter the latitude of this location. Press Enter when finished. Latitude should be entered in degrees, in decimal format. South latitudes are entered as negative numbers:
   E.g., 45°, 30' S would be entered as "−45.5"
4. Double click the "Longitude" cell and enter the longitude of this location. Press Enter when finished. Longitude should likewise be entered in degrees, in decimal format. East longitudes are entered as negative numbers:
   E.g., 163°, 45' E would be entered as −163.75
5. You may add as many locations as you wish. When done editing locations, press the "Save" button to save changes and close the dialog.

To remove a preset location:

1. Select a cell in the row you wish to delete.
2. Press the "Delete Entry" button.
3. A dialog will ask you to confirm your deletion.

Connecting to the Rotator Element

The controller elements use a COM port or COM emulation using USB. They may connect at 4800 baud and no modem configuration can be selected. COM monitoring is not available with the controller element. Connected message will immediately be displayed if the selected COM port is connected to an active controller element when you press "CONNECT".

Controller—Client Portion

The Controller allows remote access to the controller system over a TCP/IP network. It is capable of connecting to up to 10 remote servers simultaneously and giving access to each rotator connected to the remote systems.

The user interface for the Controller is composed of two windows: the Servers Window and the Controller Window.

Servers Window

Figure 30:
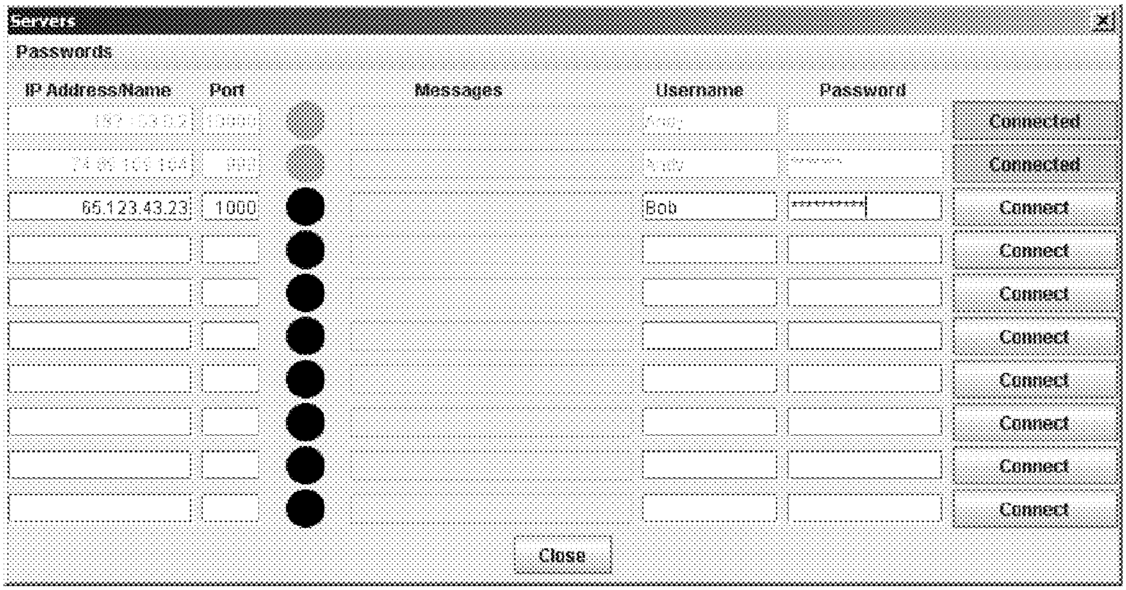
FIG. 30 illustrates a Servers Window in the Controller, in accordance with various embodiments.

The Servers Window in the Controller, shown in FIG. 30, is responsible for managing the servers to which this controller is connected. Servers are identified by IP address (or hostname) and port. To connect to a server each controller supplies a username and password.

Connecting to a Server

From the Controller Window, select CONFIGURATION/SERVERS. This will display the Servers Window.

In the first available row, enter the IP address or hostname of the server under the "IP Address/Name" heading.

Enter the TCP/IP port of the server under "Port" heading.

Enter username and password for this server. (To edit users and passwords, please see the USAP Server documentation.)

Press "Connect". After a moment you should see the green status light and the word "Connected" displayed on the button. The Controller window will display a control panel for each rotator attached to the remote server.

If the controller is unable to establish a connection to the server it will retry every 15 seconds until a connection is made. The connect button will display "Retrying . . . " and the status light will be yellow.

This can happen when:

The IP address and/or port is incorrect

The Server is not running

The Server is already connected to the maximum number of connections it will allow If the username and/or password are incorrect, the status light will turn red and a message such as "Invalid user/pass" will explain the error. In this case the server will not attempt to reconnect.

The controller will not allow two connections to the same Server (as identified by IP address and port). If the user attempts this the server window will display the error "Already Connected" with the red status light.

Controller Window

Figure 31:
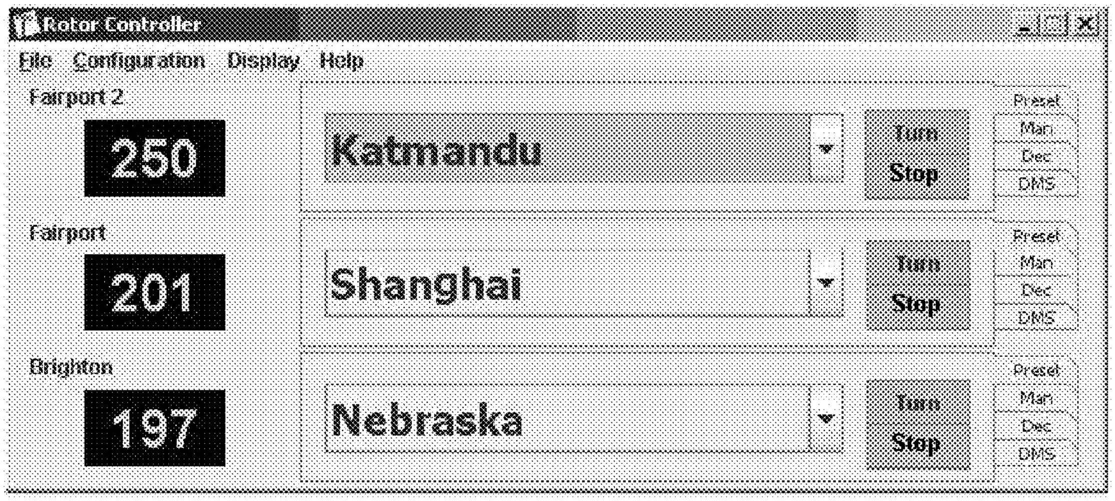
FIG. 31 illustrates a Controller Window that provides an interface for controlling individual rotators, in accordance with various embodiments.

The Controller Window FIG. 31 displays the current status of rotator and their headings in degrees. It also provides an interface for controlling each individual rotator. In FIG. 31 the Controller main window shows three rotators named "Fairport", 'Fairport 2", and "Brighton".

The Rotator Control Panel

Figure 32:
FIG. 32 illustrates an exemplary Rotator control panel, in accordance with various embodiments.

FIG. 32 illustrates a Rotator control panel representing the "Fairport" rotator.

Each rotator on a remote server is represented by a Rotator Control Panel. The left side of the Rotator Control Panel displays the rotator's name and the direction it is currently pointing. Placing the mouse over the rotator name will display the IP address of the server to which it is connected.

The display will also indicate when the rotator is in motion or is in an offline or error state as shown in FIG. 33.

If the server should lose communication with a rotator or if the server itself becomes disconnected from the controller, the rotator control panel will become disabled as shown in the disabled rotator control panel of FIG. 34. The rotator control panel will remain in a disabled status until either the rotator comes back online, or the user removes the disabled panel by selecting "Remove disabled rotators" from the "Display" menu.

Turning the Rotator

The USAP Controller provides four different methods of controlling the rotator: Preset, Manual, Decimal, and DMS. These four methods are selected by choosing the appropriate tab on the right side of the rotator control panel. In each panel the "Stop" button will cancel any previous commands and return the rotator to a stopped state.

The Preset Tab shown in FIG. 35 allows the user to turn the remote rotator to a preset location. The list is provided by each individual server.

To turn the rotator to a preset location:

Select the "Preset" tab at the right of the rotator control panel.

Select a location from the pull down menu in the middle of the panel.

Press the "Turn" button to turn the rotator. You should see the heading display change as the remote rotator is moving.

Figure 36:
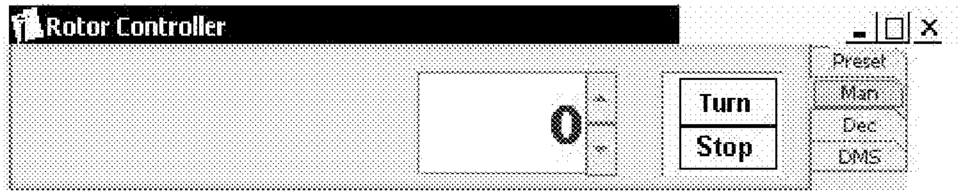
FIG. 36 illustrates a Manual Tab GUI, in accordance with various embodiments.

Manual Tab allows the user to turn the rotator to a specific direction in degrees. A manual GUI window illustrating a Manual Tab is shown in FIG. 36.

To turn the rotator to a manual heading:

Select the "Man" tab at the right of the rotator control panel.

Enter a heading in degrees (0-359) in the spinner window or use the up/down spinner buttons to select a new heading.

Press the "Turn" button to turn the rotator. You should see the heading display change as the remote rotator is moving.

Figure 37:
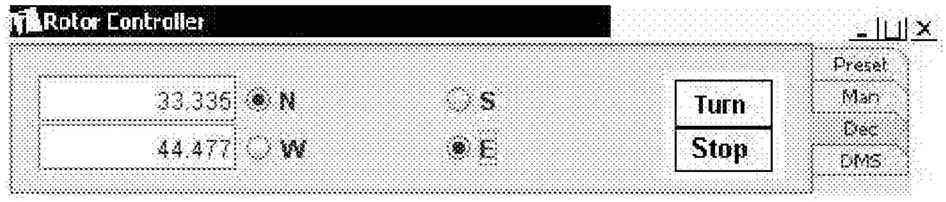
FIG. 37 illustrates a Decimal Tab GUI, in accordance with various embodiments.

Dec: P provides entry for latitude and longitude in decimal format. A decimal degree GUI window that illustrates a Decimal Tab is shown in FIG. 37.

To turn the rotator to a decimal-formatted lat/long location:

Select the "Dec" tab at the right of the rotator control panel.

Enter latitude longitude in the fields provided. Latitude is between 0 and 90 degrees, longitude between 0 and 180 degrees.

Check the appropriate N/S and E/W boxes latitude and longitude, respectively.

Press the "Turn" button to turn the rotator. You should see the heading display change as the remote rotator is moving.

Figure 38:
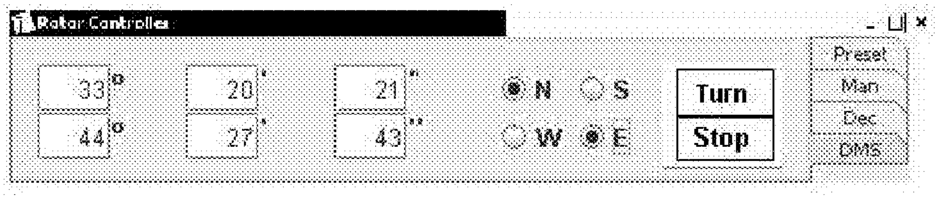
FIG. 38 illustrates a Degrees/Minutes/Seconds Tab GUI, in accordance with various embodiments.

DMS: Provides entry for latitude and longitude in Degrees/Minutes/Seconds. A Degree Minute second GUI window is shown in the DMS Tab GUI of FIG. 38.

To turn the rotator to a DMS formatted lat/lon location:

Select the "DMS" tab at the right of the rotator control panel.

Enter latitude longitude in the fields provided. Latitude is between 0 and 90 degrees, longitude between 0 and 180 Degrees. Minutes(') and Seconds(") are between 0 and 59.

Check the appropriate N/S and E/W boxes latitude and longitude, respectively.

Press the "Turn" button to turn the rotator. You should see the heading display change as the remote rotator is moving.

| Menus | | |
|---|---|---|
| File | Exit | Exits the Program |
| Configuration | Servers | Displays the Servers Window |
| | Restore Defaults | Resets any stored program information (Servers and address). This does not affect saved passwords. |
| Display | Remove Inactive Rotators | Removes all disabled rotators from display |
| Help | Help | Displays help document |
| | About | Displays program information and version |

Breaking Torque

Breaking torque, expressed in inch-pounds, is the minimum torque (twisting) on the output shaft of the rotator that will force the gears to turn when the rotator is not being powered by its own motor. This rotator employs a high ratio worm gear and slewing gear combination to produce the worm gear driven slewing ring that, short of total destruction, will not permit the gears to turn with any amount of torque delivered to the output shaft. The only way to turn the output shaft is by activating the integral motor. For this rotator, the rated operational motor driven output torque is large, such as 4300 inch pounds and potentially much higher. The factor of safety for the gearing, for example, may be four, which results in a breaking torque in excess of approximately 150,000 inch pounds, in this example. These numbers are much higher than those for other rotators of the same size that normally use other gearing systems.

The high reduction worm gear for driving the slewing ring is used in this rotator because it has advantages over the commonly used chain drives and straight cut gear trains. These more standard gearing combinations will be forced to try and turn throughout the gearing mechanisms. This causes wear and undefined movement throughout the rotator. When sufficient breaking torque is applied, unless there is a break mechanism or worm gear arrangement in the path the gears will turn and permit the antenna to move. The worm gear has a braking torque that is limited only by strength of gears of the rotator element worm gear and the worm gear driven slewing ring.

Overturning moment is the maximum allowable force, expressed in foot-pounds, which would tend to tip the rotator over. This rotator employs a large diameter slewing gear with bearings around its perimeter that operate in direct compression and tension to handle the forces. The overturning moment rating of this gearbox is large, 15,000 foot-pounds, which is much higher than most other similar sized rotators. Thus, the rotator element may employ a number of bearings arranged around the perimeter of the slewing ring to transmit large overturning loads directly to the rotator base. Other rotators often use cast aluminum housings with aluminum bearing races or two relatively small diameter ball bearings that are not designed to handle the large load ratings of the slewing gear.

Vertical load capability is the maximum allowable force, expressed in pounds, which can be placed on the rotator that appears as a dead weight. This rotator employs a large diameter slewing gear with bearings around its perimeter that operate in direct compression to easily handle very large forces. The vertical load rating of this gearbox is large, such as 10,000 pounds or more, which is much higher than most other similar sized rotators. Other rotators often use cast aluminum housings with aluminum bearing races or two relatively small diameter ball bearings to take the vertical load. In this rotator the large vertical loads are directly transmitted to the slewing ring gear and its multiple bearings which function in direct compression.

It is noted that the high overturning moment limit of the rotator assembly element provided herein makes it much less likely that the user will have to install a thrust bearing. When high overturning moment conditions, such as high winds, prevail, the rotator might ordinarily be installed some distance down from the tope of the antenna tower and the thrust bearing installed at the top of the tower. With the thrust bearing located well above the rotator, there is very limited exposure to snapping off the rotator in high wind conditions. This is contrasted with the high overturning moment specification of the rotator assembly of the various embodiments, in which it is much less likely to require a thrust bearing. Thus, as described herein, the rotator element has an overturning moment that supports mounting of the rotator element at the top of an antenna tower with an antenna directly mounted to the rotator element. A thrust bearing is not required or used.

It is noted that the high overturning moment achieved with the various embodiments herein is a result of the large diameter of the bearing races that are part of the slewing gear. Most other type of rotators have conventional bearings that are much smaller in diameter.

Figure 24:
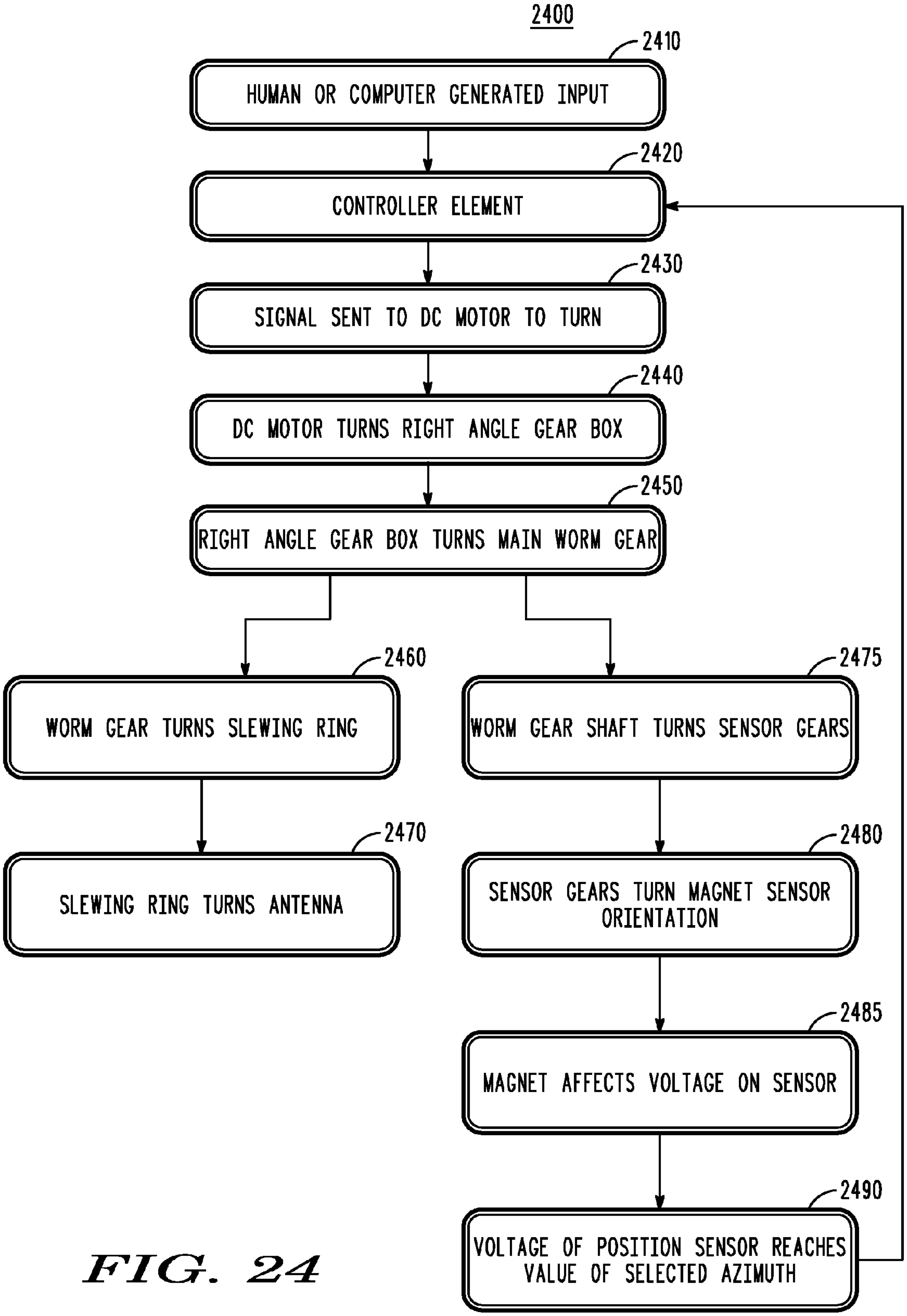
FIG. 24 illustrates a methodology for operation of the azimuth control assembly, in accordance with various embodiments.

Referring now to FIG. 24, a flow 2400 representative of the theory of operation in accordance with certain embodiments is shown. Human or computer generated input at Block 2410 is provided to the controller element at Block 2420. The controller element sends a signal to the DC motor to turn at Block 2430, which causes a right angle gear box to turn at Block 2440. The right angle gear box turns a main worm gear at Block 2450. This, in turn, causes the worm gear to turn the slewing ring at Block 2460, which turns the antenna at Block 2470. It also causes the worm gear shaft to turn sensor gears at Block 2475. The sensor gears turn the magnet sensor orientation at Block 2480. The magnet of the sensor element affects the voltage on the sensor at Block 2485. At Block 2490, the voltage of the position sensor reaches the value of the selected azimuth. The controller can then turn off the DC voltage to the motor. Flow can return to Block 2420 as shown.

Figure 25:
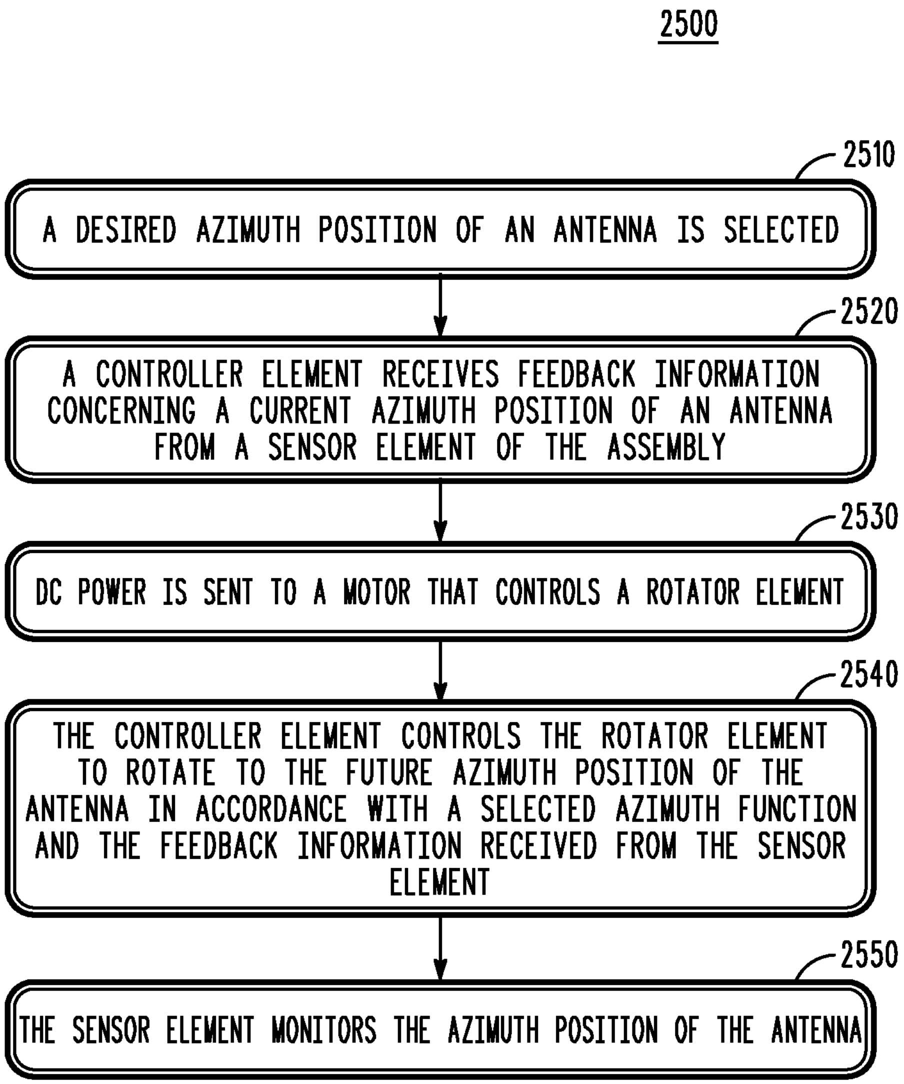
FIG. 25 illustrates a methodology for providing azimuth control of an antenna, in accordance with various embodiments.

Referring now to FIG. 25, a flowchart 2500 that illustrates a flow of providing azimuth control of an antenna is illustrated. At Block 2510, a desired future azimuth position of an antenna is selected. As previously discussed, this future azimuth position may be selected by a human user via a user interface, or it may be automatically selected by a computer, for example. At Block 2520, a controller element receives feedback information concerning a current azimuth position of the antenna from a sensor element of the assembly. DC power can then be sent to a motor that controls a rotator element at Block 2530. At Block 2540, the controller element controls a rotator element to rotate to the future azimuth position of the antenna in accordance with a selected azimuth function and the feedback information received from the sensor element. As noted, the rotator element can be turned clockwise or counterclockwise towards the specified desired azimuth setting. At Block 2550, the sensor element monitors the azimuth position of the antenna.

This flow illustrates the method of providing azimuth antenna control of an assembly described in accordance with various embodiments. The controller element of the assembly receives feedback information concerning a current azimuth position of an antenna from a sensor element of the assembly. The controller element then can control a rotator element of the assembly to rotate to a future azimuth position of the antenna in accordance with a selected azimuth function and the feedback information received from the sensor element, wherein the controller element controls the rotator element to continuously rotate greater than 360 degree or partially rotate in either direction. a user selecting the selected azimuth function by interfacing with a user interface of the controller element. Moreover, as shown in FIG. 25, a user can select the selected azimuth function by interfacing with a user interface of the controller element. A programmed processor then controls operation of the user interface in accordance with user inputs received from the user interface and controls the rotator element to rotate to the future azimuth position of the antenna in accordance with the user selected azimuth function and the feedback information provided by the sensor element.

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

What is claimed is:

1. An assembly suitable to provide azimuth antenna control, comprising:

a rotator element comprising:

a worm gear driven slewing ring and having a through hole through operable to receive a feed line to an antenna that is inserted to accommodate continuous rotation of greater than 360 degrees or partial rotation in either direction of the antenna coupled to the rotator element;

a sensor element coupled to the rotator element; and a controller element coupled to the rotator element and to the sensor element, wherein the controller element receives feedback information concerning a current azimuth position of the antenna from the sensor element and wherein the controller element controls the worm gear driven slewing ring of the rotator element to rotate to a future azimuth position of the antenna in accordance with a selected azimuth function and the feedback information provided by the sensor element.

2. The assembly of claim 1, wherein the sensor element is a magnetically controlled absolute encoder which provides feedback to the controller element.

3. The assembly of claim 2, wherein the sensor element is a bar magnet position sensing absolute encoder.

4. The assembly of claim 1, the rotator element further comprising a worm gear that drives the worm gear driven slewing ring and the assembly further comprising a DC motor having a gear reduction box that drives the worm gear of the rotator element.

5. The assembly of claim 1, wherein the selected azimuth function is a user selected azimuth function.

6. The assembly of claim 1, wherein the controller element further comprises:

a user interface, wherein a user of the controller element controls the future azimuth position of the antenna in accordance with the selected azimuth function selected by using the user interface;

a programmed processor that controls operation of the user interface, receives user inputs from the user interface, and controls operation of the worm gear driven slewing ring of the rotator element to rotate to the future azimuth position of the antenna in accordance with the user selected azimuth function and the feedback information provided by the sensor element.

7. The assembly of claim 6, wherein the user interface provides three options for the selected azimuth function to the user, comprising:

a rotary option, wherein when the rotary option is selected the programmed processor of the controller element controls the worm gear driven slewing ring of the rotator element to rotate greater than 360 degrees;

a forever option, wherein when the forever option is selected the programmed processor of the controller element controls the worm gear driven slewing ring of the rotator element to continuously rotate in a selected direction;

a limits option, wherein when the limits option is selected the programmed processor of the controller element controls the worm gear driven slewing ring of the rotator element to rotate less than 360 degrees.

8. The assembly of claim 1, wherein the controller element has a ramp feature that controls a rotation speed of the rotator element to ramp up in speed or ramp down in speed by varying the speed of rotation of the antenna.

9. The assembly of claim 1, wherein the feed line to the antenna is coupled with a rotary joint of the rotator element and the controller element controls the rotator element to continuously rotate about the rotary joint in either direction for an infinite number of turns.

10. The assembly of claim 1, wherein the rotator element has a gear reduction system directly coupled to a worm gear that controls the sensor element.

11. The assembly of claim 1, further comprising a worm gear of the rotator element that drives the worm gear driven slewing ring and wherein the worm gear has a braking torque limited only by strength of gears of the worm gear and the worm gear driven slewing ring.

12. The assembly of claim 1, wherein the rotator element has an overturning moment that supports mounting of the rotator element at the top of an antenna tower with an antenna directly mounted to the rotator element.

13. The assembly of claim 1, wherein rotator element has dimensions that fit within an 18 inch face width tower section splice.

14. The assembly of claim 1, wherein the through hole of the worm gear driven slewing ring accommodates an antenna support mast to be installed from above or below the rotator element.

15. The assembly of claim 1, wherein the rotator element further comprises a plurality of bearings arranged around the perimeter of the worm gear driven slewing ring that transmit large vertical loads directly to the rotator element base.

16. The assembly of claim 1, wherein the sensor element is an azimuth position sensor element.

17. A system that provides remote azimuth antenna control, comprising:

a rotator element;

a sensor element coupled to the rotator element;

a server coupled to the rotator element;

a plurality of controller elements, wherein the server controls operation of each controller element of the plurality of controller elements over a plurality of network connections between the server and the plurality of controller elements, wherein for each controller element of the plurality of controller elements that is coupled to the server, the controller element receives feedback information concerning a current azimuth position of the antenna from the sensor element and wherein the controller element controls the rotator element to rotate to a future azimuth position of the antenna in accordance with a selected azimuth function and the feedback information provided by the sensor element.

18. The system of claim 17, wherein the server has a plurality of preset locations and names of the preset locations are sent to each controller element that is coupled to the server.

19. The system of claim 17, wherein the future azimuth position of the antenna is given by the azimuth of the future azimuth position, is calculated from a latitude and a longitude, or is a preset location.

20. The system of claim 17, wherein the rotator element further comprises:

a worm gear driven slewing ring having a through hole through operable to receive a coaxial feed line that is inserted to accommodate a continuous rotation of greater than 360 degrees or partial rotation in either direction of an antenna coupled to the rotator element.

21. The system of claim 17, wherein a controller element of the plurality of controller elements is remotely controlled and accessed via the Internet.

22. A method of providing azimuth antenna control of an assembly, comprising:

a controller element of the assembly receiving feedback information concerning a current azimuth position of an antenna from a sensor element of the assembly;

the controller element controlling a rotator element of the assembly to rotate to a future azimuth position of the antenna in accordance with a selected azimuth function and the feedback information received from the sensor element, wherein the controller element controls the rotator element to continuously rotate greater than 360 degree or partially rotate in either direction.

23. The method of claim 22, further comprising:

inserting a feed line to the antenna through a through hole of a worm gear driven slewing ring of the rotator element of the assembly, wherein insertion of the feed line through the through hole accommodates continuous rotation of greater than 360 degrees or partial rotation in either direction of the antenna coupled to the rotator element.

24. The method of claim 22, further comprising:

the controller element controlling a worm gear of the rotator element that engages a worm gear driven slewing ring of the rotator element.

25. The method of claim 22, further comprising:

a user selecting the selected azimuth function by interfacing with a user interface of the controller element;

a programmed processing controlling operation of the user interface in accordance with user inputs received from the user interface and controlling the rotator element to rotate to the future azimuth position of the antenna in accordance with the user selected azimuth function and the feedback information provided by the sensor element.

26. The method of claim 25, wherein the user selecting the selected azimuth function further comprises the user selecting at least one of a rotary option, a forever option, and a limits option through the user interface.

27. The method of 26, wherein when the rotary option is selected the programmed processor of the controller element controls a worm gear driven slewing ring of the rotator element to rotate greater than 360 degrees;

wherein when the forever option is selected the programmed processor of the controller element controls the worm gear driven slewing ring of the rotator element to continuously rotate in a selected direction; and wherein when the limits option is selected the programmed processor of the controller element controls the worm gear driven slewing ring of the rotator element to rotate less than 360 degrees.

28. The method of claim 26, further comprising the user selecting at least one of the rotary option, the forever option, and the limits option during a setup mode of the controller element.

29. The method of claim 22, further comprising:

an user setting a ramp feature of the controller element to ramp up in speed or ramp down in speed by varying the speed of rotation of a worm gear driven slewing ring of the rotator element.

30. The method of claim 29, further comprising:

the user setting the ramp feature by interfacing with the user interface of the controller element during a setup mode of the controller element.

31. The method of claim 22, further comprising:

remotely controlling and accessing the controller element via the Internet.

32. The method of 22, further comprising:

a server coupled to the rotator element controlling operation of each controller element of a plurality of controller elements over a plurality of network connections between the server and the plurality of controller elements, wherein for each controller element of the plurality of controller elements that is coupled to the server, the controller element receives feedback information concerning a current azimuth position of the antenna from the sensor element; and the server controlling the rotator element to rotate to a future azimuth position of the antenna in accordance with a selected azimuth function and the feedback information provided by the sensor element.

33. The method of 32, further comprising:

transmitting names of a plurality of preset locations from the server to each controller element of the plurality of controller elements that is coupled to the server.

34. The method of claim 32, further comprising:

remotely accessing via the Internet a controller element of the plurality of controller elements.

* * * * *